(12) United States Patent
Jess et al.

(10) Patent No.: US 10,265,940 B2
(45) Date of Patent: Apr. 23, 2019

(54) FABRIC HANDLING APPARATUS

(71) Applicant: SHORT BROTHERS PLC, Belfast (GB)

(72) Inventors: Andrew Jess, Delta (CA); Lynsey Bowman, Holywood (IE); Paul Frazer, Holywood (IE)

(73) Assignee: SHORT BROTHERS PLC, Belfast (IE)

( * ) Notice: Subject to any disclaimer, the term of this patent is extended or adjusted under 35 U.S.C. 154(b) by 630 days.

(21) Appl. No.: 14/654,200

(22) PCT Filed: Dec. 21, 2012

(86) PCT No.: PCT/EP2012/076793
§ 371 (c)(1),
(2) Date: Jun. 19, 2015

(87) PCT Pub. No.: WO2014/094903
PCT Pub. Date: Jun. 26, 2014

(65) Prior Publication Data
US 2015/0314583 A1     Nov. 5, 2015

(51) Int. Cl.
*B29C 31/08* (2006.01)
*B32B 38/18* (2006.01)
(Continued)

(52) U.S. Cl.
CPC ............ *B32B 38/1808* (2013.01); *B25J 5/02* (2013.01); *B25J 9/0078* (2013.01); *B25J 9/0084* (2013.01);
(Continued)

(58) Field of Classification Search
CPC ..... B29C 70/38; B29C 70/382; B29C 70/384; B32B 2038/1891; B32B 38/1808; B25J 9/026
See application file for complete search history.

(56) References Cited

U.S. PATENT DOCUMENTS 4,124,242 A * 11/1978 Canner ................. B29C 31/08
                                                221/214
4,968,019 A    11/1990 Tanabe et al.
(Continued)

FOREIGN PATENT DOCUMENTS

CN     101426636 A    5/2009
DE       2025203 A1   4/1971
(Continued)

OTHER PUBLICATIONS

Chinese Office Action dated Feb. 16, 2017, for Chinese Patent Application No. 201280077939.7.
(Continued)

*Primary Examiner* — Galen H Hauth
(74) *Attorney, Agent, or Firm* — Karceski IP Law, PLLC

(57) ABSTRACT

A fabric handling apparatus includes a layup table, a mold disposed adjacent to the layup table, and a fabric handling array suspended above the layup table and the mold. The fabric handling array is adapted to transfer at least one fabric shape from the layup table to the mold. The fabric handling array includes a plurality of attractors in an attractor array. An orientation of the fabric handling array is alterable with respect to at least one of the layup table and the mold so that the at least one fabric shape is positionable on the mold in a predetermined orientation.

18 Claims, 29 Drawing Sheets

(51) Int. Cl.
| | |
|---|---|
| *D06M 10/00* | (2006.01) |
| *D06M 17/00* | (2006.01) |
| *B32B 37/18* | (2006.01) |
| *B32B 39/00* | (2006.01) |
| *B32B 38/00* | (2006.01) |
| *B32B 5/02* | (2006.01) |
| *B25J 11/00* | (2006.01) |
| *B29C 70/38* | (2006.01) |
| *B29C 70/54* | (2006.01) |
| *B65H 5/08* | (2006.01) |
| *B25J 5/02* | (2006.01) |
| *B25J 9/00* | (2006.01) |
| *B25J 9/02* | (2006.01) |
| *B25J 15/00* | (2006.01) |
| *B25J 15/06* | (2006.01) |
| *B65H 9/10* | (2006.01) |

(52) U.S. Cl.
CPC ............... *B25J 9/026* (2013.01); *B25J 11/00* (2013.01); *B25J 15/0052* (2013.01); *B25J 15/0616* (2013.01); *B29C 31/085* (2013.01); *B29C 70/38* (2013.01); *B29C 70/545* (2013.01); *B32B 5/02* (2013.01); *B32B 37/18* (2013.01); *B32B 38/0004* (2013.01); *B32B 39/00* (2013.01); *B65H 5/08* (2013.01); *B65H 9/10* (2013.01); *D06M 10/00* (2013.01); *D06M 17/00* (2013.01); *B32B 2309/70* (2013.01); *B32B 2605/18* (2013.01); *B65H 2402/30* (2013.01); *B65H 2701/11312* (2013.01); *B65H 2701/174* (2013.01); *Y10T 83/0448* (2015.04); *Y10T 83/2183* (2015.04); *Y10T 156/17* (2015.01)

(56) References Cited

U.S. PATENT DOCUMENTS

| | | | |
|---|---|---|---|
| 5,009,409 A | 4/1991 | Nathoo et al. | |
| 5,236,535 A * | 8/1993 | Smith ............ | B65C 9/1884 156/250 |
| 5,264,067 A * | 11/1993 | Kuchta ............ | B23Q 1/01 156/361 |
| 6,343,639 B1 | 2/2002 | Kaye et al. | |
| 6,355,126 B1 * | 3/2002 | Ogawa ............ | B29D 30/1657 156/117 |
| 7,137,182 B2 | 11/2006 | Nelson | |
| 7,213,629 B2 | 5/2007 | Ledet et al. | |
| 7,228,611 B2 | 6/2007 | Anderson et al. | |
| 7,376,480 B2 | 5/2008 | Hagen et al. | |
| 7,611,601 B2 | 11/2009 | Nelson et al. | |
| 7,688,434 B2 | 3/2010 | Engelbart et al. | |
| 7,766,596 B2 | 8/2010 | Smith et al. | |
| 7,773,363 B2 | 8/2010 | Pelrine et al. | |
| 8,087,441 B2 | 1/2012 | Wampler et al. | |
| 8,088,236 B2 | 1/2012 | Schendel et al. | |
| 8,092,396 B2 | 1/2012 | Peng et al. | |
| 8,114,241 B2 | 2/2012 | Iagulli et al. | |
| 2007/0187026 A1 | 8/2007 | Burgess et al. | |
| 2007/0277919 A1 | 12/2007 | Savol et al. | |
| 2011/0073238 A1 | 3/2011 | Johnson et al. | |
| 2011/0240213 A1 | 10/2011 | Barlag et al. | |
| 2012/0006472 A1 | 1/2012 | Nelson et al. | |
| 2013/0127192 A1 * | 5/2013 | Regan ............ | B25J 15/0675 294/185 |

FOREIGN PATENT DOCUMENTS

| | | |
|---|---|---|
| DE | 102006021110 A1 | 11/2007 |
| DE | 102011106214 A1 | 12/2012 |
| EP | 0429901 A1 | 6/1991 |
| EP | 1905709 A2 | 4/2008 |
| WO | WO 03035375 A1 | 5/2003 |

OTHER PUBLICATIONS

Chinese Office Action dated May 30, 2016, for Chinese Patent Application No. 201280077939.7.
International Search Report and Written Opinion dated Oct. 1, 2013, for International Patent Application No. PCT/EP2012/076793.
European Office Action dated Mar. 1, 2018, for European Patent Application No. 12813020.0.

* cited by examiner

FABRIC HANDLING APPARATUS

CROSS-REFERENCE TO RELATED APPLICATIONS

This is a National Stage Entry into the United States Patent and Trademark Office from International PCT Patent Application No. PCT/EP2012/076793 having an international filing date of Dec. 21, 2012, the entire contents of which are incorporated herein by reference.

FIELD OF THE INVENTION

The present invention concerns the construction and operation of an apparatus designed to lift, manipulate, and transfer fabric from a transfer station to a mold. More specifically, the apparatus of the present invention is designed to lift, manipulate, and transfer fabrics used to create composite materials, such as those employed for the construction of aircraft.

DESCRIPTION OF THE RELATED ART

The prior art includes examples of several devices that may be employed to handle fabric materials. This includes woven and non-woven fabric such as flexible carbon fabric.

By way of background, as should be apparent to those skilled in the art, for large, low volume composite components, hand lay-up remains the most common method for molding such composite components, which include items such as aircraft components, aircraft wings, aircraft fairings, boat hulls, wind turbines blades, and the like.

The assembly of certain aircraft components, such as aircraft wings, involves the formation of complex, three dimensional geometries with multiple curvatures. To create these geometries, large pieces of carbon fiber fabric are employed together with stiffeners (also called stringers in aircraft) that are integrated into the wing skin. For a conventional hand layup, it is estimated that about an hour is required to handle about 15 kg (38.1 lb) of fabric material. Production time is therefore an issue.

As should be apparent to those skilled in the art, manual processes are prone to error and may, in some instances, lack precise reproducibility.

It is known, for example, that manual handling of fabric materials may result in stretching or creasing of the fabric material. In addition, if gripping tools are used, the gripping tools may damage the fabric during handling, especially at the locations where the gripper tools are used. These deformations may adversely affect the ability to produce a composite component by increasing production times, especially if damaged fabric plies need to be removed and replaced prior to final formation of the composite component.

By way of background, some prior art references describe the formation of composite structures relying on plies of carbon fiber fabric. Other prior art references rely on strips (i.e., narrow strips) of composite materials that are applied in an overlapping pattern. It is the first of these two techniques that presents particular challenges to the manufacturer of composite components.

U.S. Pat. No. 6,343,639 (hereinafter "the '639 Patent") describes a machine for laying up fabric to produce a laminate. The machine includes a table 18 with a perforated upper surface 19. (The '639 Patent at col. 2, lines 59-64.) Fabric is deposited onto the table 18 from a roll of fabric 30. (The '639 Patent at col. 3, lines 5-10.) A roller 48 is provided to pick up the fabric element, after being cut into the appropriate shape, using vacuum pressure. (The '639 Patent at col. 4, lines 28-37.) The shaped material is then transferred to a layup station 40, 42 where it is deposited. (The '639 Patent at col. 4, lines 38-46.)

U.S. Patent Application Publication No. 2007/0187026 (hereinafter "the '026 Application") describes a fabric handling apparatus and a method of composite manufacture. Here, the fabric is cut and shaped on a cutting table 110. (The '026 Application at paragraph [0023].) The cut fabric may then be transferred from the cutting table 110 to a mold table 170 after being rolled up onto a vacuum actuated take up drum 130. (The '026 Application at paragraphs [0024]-[0025].)

U.S. Patent Application Publication No. 2011/0240213 (hereinafter "the '213 Application") describes a method and device for laying and draping portions of reinforcing fiber structure to produce a profiled preform. The '213 Application relies on opposed roller conveyors 21, 22 to deposit fabric onto a core 19. (The '213 Application at paragraph [0053].)

U.S. Pat. No. 8,088,236 (hereinafter "the '236 Patent") describes an apparatus and method for producing a large area fiber composite structural component. The apparatus includes a shaping element 1 onto which a nonwoven carpet 15 is deposited from nonwoven rolls 2, 3. (The '236 Patent at col. 6, lines 4-13.)

U.S. Pat. No. 7,228,611 (hereinafter "the '611 Patent") describes a method of transferring a large uncured composite laminate from a male layup mandrel tool to a female cure tool. (The '611 Patent at the Abstract.)

U.S. Pat. No. 8,114,241 (hereinafter "the '241 Patent") describes a method for applying a vacuum bag around a fuselage barrel made of material to be polymerized. The sheet of bag material 30 is applied to the mandrel 10 as the mandrel rotates about a rotational axis. (The '241 Patent at col. 4, lines 1-6.)

U.S. Pat. No. 7,611,601 (hereinafter "the '611 Patent") describes an automated layup system and method that relies on the application of multiple strips of fabric onto a layup mold or tool. (The '601 Patent at col. 4, lines 40-64.)

U.S. Pat. No. 7,137,182 (hereinafter "the '182 Patent") describes an apparatus for forming a composite structure that relies on a plurality of material dispensers, arranged side-by-side, to deposit strips of material 62 onto a mold. (The '182 Patent at col. 4, lines 8-35.) The mold is positioned on a rotary turntable 80. (The '182 Patent at col. 3, lines 39-47.)

U.S. Patent Application Publication No. 2007/0277919 (hereinafter "the '919 Application") describes a system and method for automatic monitoring of a composite manufacturing process. The process relies on laser light to assist with detection of edges, overlaps, gaps, wrinkles, and foreign object debris that may impact upon the manufacturing process. (The '919 Application at the Abstract.)

While each of the methods and apparatuses described above provide at least some solutions for automating the manufacture of fabric components, a desire remains for mechanical devices that automate the layup and handling of large plies of fabric materials.

Additionally, there is a desire for a mechanical device that may help to improve the reliability, accuracy, and repeatability of layup processes associated with the manufacture of components, such as aircraft components, from fabric materials.

In summary, there remains a need for a device that handles fabric materials, such as fabrics used in the manufacture of composite components, without crimping, folding, stretching, or otherwise changing the shape of the fabric material as it is being handled.

SUMMARY OF THE INVENTION

The present invention addresses one or more deficiencies associated with the prior art.

It is, therefore, an aspect of the present invention to provide a fabric handling apparatus that includes a layup table, a mold disposed adjacent to the layup table, and a fabric handling array suspended above the layup table and the mold. The handling array is adapted to transfer at least one fabric shape from the layup table to the mold. The fabric handling array includes a plurality of attractors in an attractor array. An orientation of the fabric handling array is alterable with respect to at least one of the layup table and the mold so that the at least one fabric shape is positionable on the mold in a predetermined orientation.

One contemplated embodiment of the fabric handling apparatus of the present invention also includes at least one overhead rail extending above the layup table and the mold. The fabric handling array is suspended from the at least one overhead rail.

It is also contemplated that the fabric handling apparatus of the present invention may be structured so that the at least one overhead rail includes two overhead rails disposed a predetermined distance from one another in parallel.

Another contemplated embodiment of the present invention includes at least one gantry rail, disposed transversely to the overhead rail and supporting the overhead rail. The overhead rail is adapted to move along the at least one gantry rail. Alternatively, the at least one gantry rail includes two gantry rails disposed a predetermined distance from one another in parallel.

In still another contemplated embodiment of the fabric handling apparatus of the present invention, the mold comprises a surface adapted to receive the at least one fabric shape to form at least one aircraft component. The surface defines a shape of the at least one aircraft component. In one contemplated embodiment, the surface defines the exterior shape of at least a portion of a wing for an aircraft.

It also is contemplated that the present invention provides a fabric handling apparatus where the fabric handling array further comprises a frame and the attractors are suspended from the frame such that the attractors are displaceable vertically with respect to the frame. In this embodiment, a height adjustment device operably connected to each attractor to displace the attractor vertically with respect to the frame. Moreover, in a further variant, a cable extending between each height adjustment device and the attractor. Spooling of the cable permits displacement of the attractor with respect to the frame.

It is contemplated that the fabric handling apparatus of the present invention may include a plurality of connectors connecting adjacent ones of the attractors to one another to maintain the attractors in a substantially constant positional relationship with respect to each other.

In one contemplated embodiment, the connectors each include a rigid shaft and two ball joints, one at each end of the rigid shaft. The ball joints allow angular displacement of the rigid shaft when the attractors move vertically with respect to one another.

In another contemplated embodiment, the connectors each include a flexible shaft. The flexible shaft bends when the attractors move vertically with respect to one another.

In still another embodiment, the connectors may be part of a flexible mat that connects the attractors to one another.

The fabric handling apparatus of the present invention also may include suction cups connected to at least one source of suction. For example, the source of suction may be a vacuum source. Alternatively, the source of suction may be a pressurized gas that is supplied to the suction cups that operate via a Coanda principle.

Alternatively, the attractors may be electrostatic devices connected to a source of electricity.

The fabric handling apparatus of the present invention may include at least one layup table robot disposed adjacent to the layup table. The at least one layup table robot may be capable of executing at least one function from a group comprising cutting a fabric into the fabric shape and assessing an orientation of fibers in the fabric shape.

The layup table robot track may be disposed adjacent to the layup table on which the layup table robot travels.

It is also contemplated that the fabric handling apparatus of the present invention may have at least one mold robot disposed adjacent to the mold. The at least one mold robot may be capable of executing at least one function from a group comprising assessing an orientation of fibers in the fabric shape and tacking the fabric shape to at least one other fabric shape deposited on the mold.

The present invention also provides a method of operating a fabric handling apparatus including a layup table, a mold disposed adjacent to the layup table, and a fabric handling array suspended above the layup table and the mold. The fabric handling array is adapted to transfer at least one fabric shape from the layup table to the mold. The fabric handling array has a plurality of attractors in an attractor array. An orientation of the fabric handling array is alterable with respect to at least one of the layup table and the mold so that the at least one fabric shape is positionable on the mold in a predetermined orientation. In this arrangement, the method of the present invention includes lifting a fabric shape from the layup table via the attractors, orienting the fabric shape via the fabric handling array to a predetermined orientation, and depositing the fabric shape onto the mold in the predetermined orientation.

The method of the present invention also may include the step of measuring an orientation of fibers in fabric forming the fabric shape prior to orienting the fabric shape. The orienting of the fabric shape includes orienting the fibers to a predetermined orientation.

In addition, it is contemplated that the method may include the step of cutting fabric laid onto the layup table into the fabric shape.

Also, the method may include the step of measuring an orientation of fibers in fabric forming the fabric shape prior to cutting the fabric into the fabric shape and prior to orienting the fabric shape. The orienting of the fabric shape may include orienting the fibers to a predetermined orientation.

Further, the method of the present invention may include, after depositing the fabric shape onto the mold, tacking the fabric shape to at least one other fabric shape previously deposited onto the mold.

The method of the present invention is contemplated to proceed such that each of the lifting, orienting, and depositing steps are repeated until all fabric shapes are deposited onto the mold.

Still further features of the present invention should be appreciated from the drawings appended hereto and from the discussion herein.

BRIEF DESCRIPTION OF THE DRAWINGS

The present invention will now be described in connection with the drawings appended hereto, in which.

DETAILED DESCRIPTION OF EMBODIMENT(S) OF THE INVENTION

Figure 1:
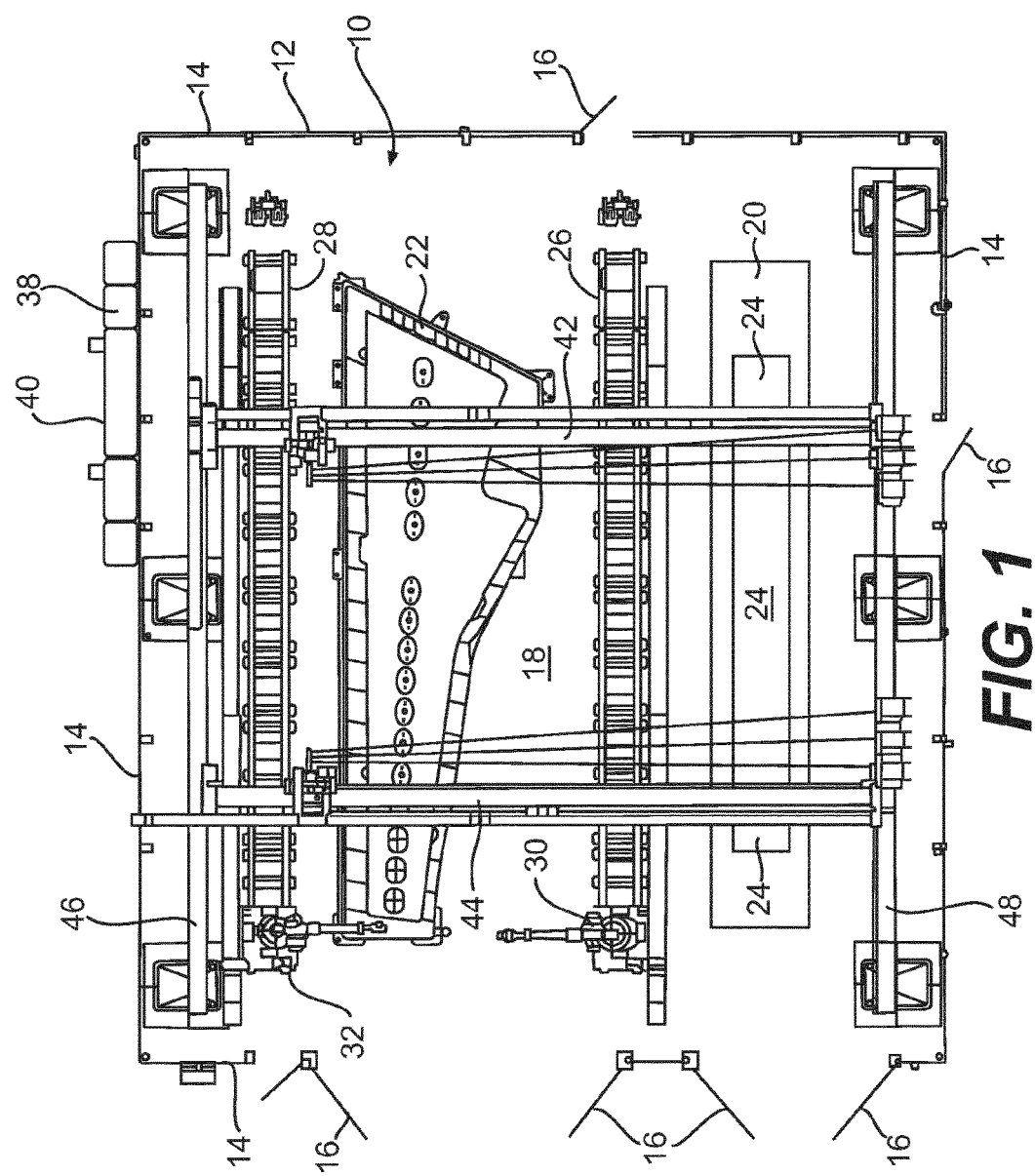
FIG. 1 is a top, plan view of one contemplated embodiment of a fabric handling apparatus of the present invention.

The present invention will now be described in connection with one or more embodiments. Discussion of any one particular embodiment is intended to be illustrative of the breadth and scope of the invention. In other words, while attention is focused on specific embodiments, those embodiments are not intended to be limiting of the scope of the present invention. To the contrary, after appreciating the discussion and drawings presented herein, those skilled in the art will readily appreciate one or more variations and equivalents of the embodiments described and illustrated. Those variations and equivalents are intended to be encompassed by the present invention as though they were described herein.

The modern manufacture of aircraft has recently departed from traditional reliance upon aluminum and aluminum alloys for the external components of the aircraft and moved to a greater reliance on composite materials. It is anticipated that future aircraft will rely even more heavily on components made from composite materials. The reason for this is simple: as a general rule, composite materials are stronger and lighter than their metallic counterparts and, at least for this reason, present engineering and design advantages over metals and their alloys.

Manufacture of components from composite materials, however, is not without its engineering challenges.

As should be apparent to those skilled in the art, and by way of background to the discussion that follows, the term "composite material" encompasses a broad category of different substances. In the context of aircraft manufacture, composite materials are understood to refer to materials containing fabrics made primarily from carbon fibers and resins. While the present invention is contemplated to encompass carbon fiber fabrics, the present invention is not intended to be limited thereto. Other fabrics used in the manufacture of composite components are also intended to be encompassed by the scope of the present invention. For example, the present invention includes, but is not limited to, materials incorporating aramid fibers, ceramics, glass, and related compounds, either now known or developed in the future. Moreover, fabrics that combine different compounds and materials together also are intended to be encompassed by the present invention.

As a general rule, fabrics fall into one of two categories. The first category is woven fabrics. Woven fabrics encompass those that are made from threads of composite materials. Woven fabrics have a weft and weave, as should be apparent to those skilled in the art. These materials are similar to cloth made from other fibrous materials, such as cotton. The second category is non-woven fabrics. Non-woven fabrics encompass those that are not made from threads woven together. Typically, non-woven fabrics combine a plurality of fibers that are randomly intertwined to form a batt or alternatively, aligned in a particular direction. These materials are sometimes known as having uni-directional or uni-axial fibers As should be apparent to those skilled in the art, when constructing an aircraft component, after multiple layers of fabric are layered onto one another in a predetermined orientation, a resin or other type of matrix material is used to bind the fabric layers to one another. Matrix materials include, but are not limited to, resins, epoxy materials, nylon, polyester, polypropylene, ceramics, and the like.

In the art, it is known that the fabric may be pre-impregnated with a matrix material, such as resin. Such fabrics are often referred to as "prepreg" fabrics. Alternatively, the fabric may be a "dry" fabric, meaning that the fabric is not pre-impregnated with the matrix material, such as resin.

In either case, it is generally recognized that the matrix material will be introduced into the fabric and cured, typically using pressure and heat to create the composite material component. Once cured into a hardened component, the hardened component may be further machined to fabricate the aircraft part.

One process employed for manufacturing and curing a composite fabric structure is known to those skilled in the art as "Resin Transfer Infusion" or "RTI." Other processes also are known in the art, and the present invention is not intended to be limited to RTI.

As also should be apparent to those skilled in the art, regardless of the type of fabric employed for the construction of an aircraft component (i.e., a prepreg or a dry fabric), construction techniques using those fabrics tend to fall within two general categories. A first approach to the manufacture of aircraft parts relies on the repetitive application of layers of fabric strips, including what is commonly referred to as "strips" or "tow." In this method of manufacture, the strips are applied to the surface of a mold, following a predetermined pattern. In a second approach to the manufacture of aircraft components, sheets of fabric, cut into predetermined shapes, are laid over one another in a predetermined pattern and arrangement. In either technique, the orientations of the fibers in the layers typically are altered from layer to layer. With each layer having a slightly different orientation, the strength of the aircraft component is maximized in many directions.

With respect to the manufacturing method that relies on the use of fabric strips, the strips are usually dispensed from a roll. In particular, as the roll of strips passes over the surface of the mold, a single layer of the fabric strips are dispensed onto the mold parallel lines. The orientation of the roll may be altered for each successive application of the strips to vary the directional orientation of the composite fibers.

The second manufacturing method relies primarily on human manipulation of the fabric. Specifically, individual pieces of material are first shaped by means of a cutting machine or other method then positioned on the mold in the correct orientation. It is, of course, possible to employ one or more mechanical devices to position pieces of pre-cut fabric in a suitable orientation for formation of the aircraft component. It is with this second manufacturing method, in particular an automated process therefor (or at least partially automated), that the present invention concerns itself.

When mechanical devices pickup and carry a piece of fabric to lay the fabric on a mold in a predetermined orientation, it is preferred for the fabric to be deposited on the mold so that the fabric is positioned properly and so that the fabric is not deformed, folded, or otherwise distorted. As should be apparent, when the fabric is deposited so that the fabric is in the correct orientation and without distortions, the layers of fabric will properly form the final composite structure after introduction and/or hardening of the matrix material.

FIG. 1 is a top, plan view of a fabric handling apparatus 10 of the present invention. The fabric handling apparatus 10 is shown within a building 12 having four walls 14 and a plurality of doors 16 permitting ingress and egress to the manufacturing area 18 within the building 12. The manufacturing area 18 is defined by the four walls 14, as shown.

The fabric handling apparatus 10 (also referred to herein as a fabric handler 10, for brevity) includes a layup table 20 and a mold 22. The layup table 20 and the mold 22 preferably are positioned adjacent to one another, as illustrated. However, the layup table 20 and the mold 22 need not be positioned adjacent to one another to practice the present invention.

In addition, the layup table 20 and the mold 22 are shown in positions that are generally parallel to one another. However, this orientation is not required to practice the present invention. The layup table 20 and the mold 22 may be disposed at angles with respect to one another without departing from the scope of the present invention.

It is noted that the mold 22 that is illustrated in FIG. 1 is typical of the shape of mold used for the formation of a portion of an aircraft wing. As should be apparent to those skilled in the art, however, the mold 22 may have any shape without departing from the scope of the present invention. For example, the mold 22 may be for the tail stabilizer section of an aircraft, the fuselage, or any other external or internal component thereof.

The layup table 20 preferably is a flat table onto which a piece of fabric 24 is placed. Immediately after its placement onto the layup table 20, the fabric 24 is understood to be in an uncut, initial state. In other words, the fabric 24 is a sheet that covers at least part of the surface of the layup table 20.

In one embodiment, the sheet is subsequently cut into one or more fabric shapes 62 (see FIGS. 5-19). After being cut into one or more fabric shapes 62, the fabric shapes 62 are transferred to the mold 22. The fabric shapes 62 are deposited on the mold 22 in a predetermined orientation to form the final, composite component.

As indicated above, it is contemplated that the fabric 24 will be laid onto the layup table 20 as a single sheet. Once laid flat, it is contemplated that the fabric 24 will be inspected for defects before being cut into one or more suitable fabric shapes 62. Once cut, any waste fabric is removed from the layup table 20, leaving only the fabric shapes 62 on the layup table 20. While it is contemplated that only one fabric shape 62 will be cut from a single sheet of fabric 24, more than one fabric shape 62 may be cut from the same sheet of fabric 24, as should be apparent to those skilled in the art.

To maintain the sheet of fabric 24 and any of the fabric shapes 62 on the layup table 20 so that they are not disturbed, it is contemplated that the layup table may be perforated and connected to a suction source 38 (or vacuum source 38). Alternatively, the surface of the layup table 20 may be provided with one or more electrostatic devices (not shown) to secure the sheet of fabric 24 or the fabric shapes 62 thereto.

In a variation of the fabric handling apparatus 10, it is contemplated that a separate cutting table (not shown) may be employed. If so, it is contemplated that selected fabric shapes 62 will be transferred to the layup table 20 from the cutting table. From the layup table 20, the fabric shapes are then transferred to the mold 22.

In this variation, it may be desired, for example, to assemble several fabric shapes 62 of different sizes and shapes onto the layup table 20 so that all of the fabric shapes 62 are transferred to the mold 22 together, as discussed in greater detail below in connection with FIGS. 11-19.

Figure 2:
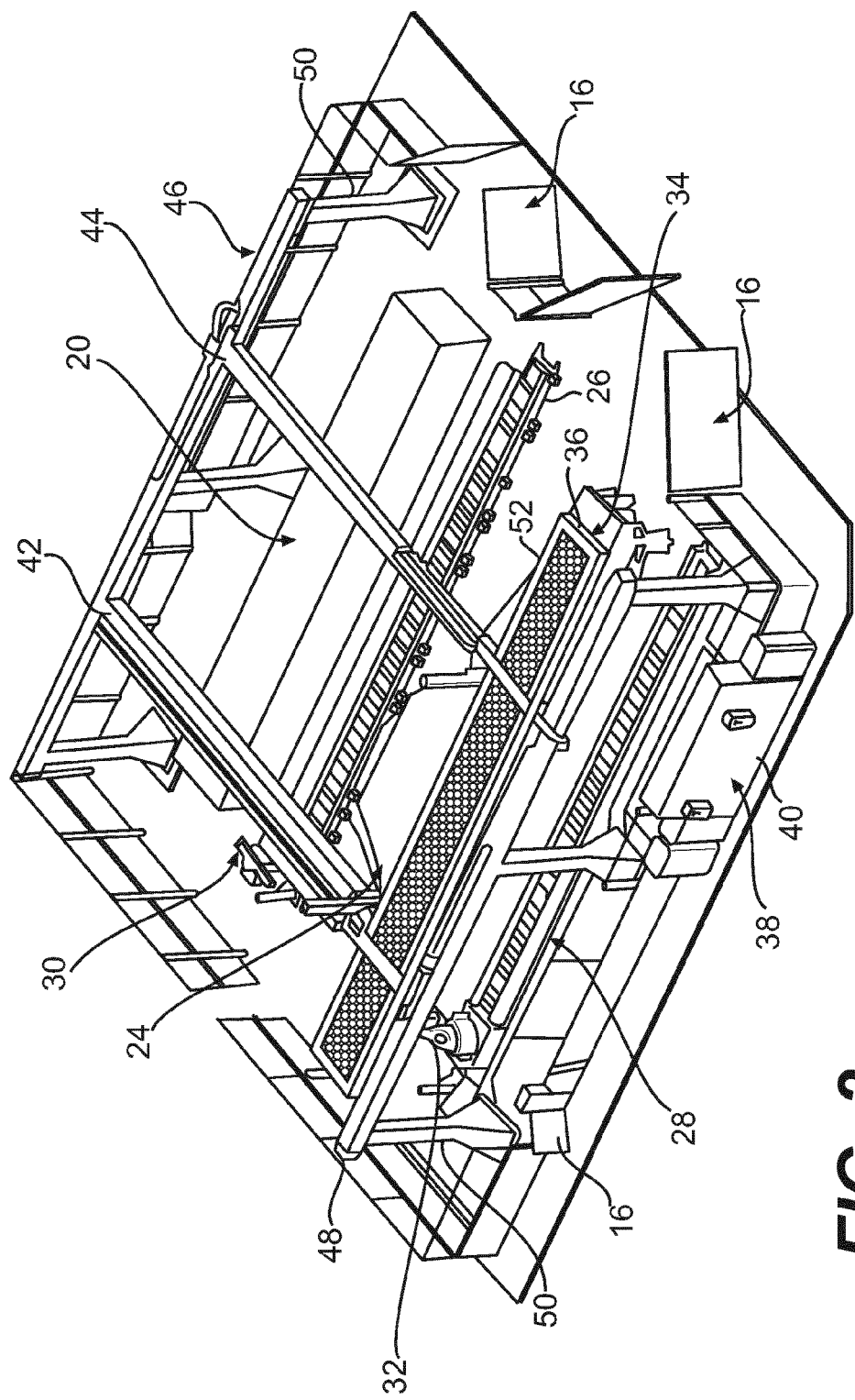
FIG. 2 is a perspective illustration of the fabric handling apparatus illustrated in FIG. 1.

With continued reference to FIG. 1 and FIG. 2, the fabric handling apparatus 10 includes two tracks 26, 28. The layup table track 26 is disposed adjacent to the layup table 20. The mold track 28 is disposed adjacent to the mold 22. The layup track 26 supports at least one layup table robot 30. Similarly, the mold track 28 supports at least one mold robot 32. As should be apparent to those skilled in the art, the tracks 26, 28 guide the robots 30, 32 adjacent to their respective stations.

It is contemplated that the layup robot 30 and the mold robot 32 will perform a number of different functions in association with the fabrication of a composite aircraft component. For example, the robots 30, 32 may include one or more measuring devices to measure the shapes and sizes of the fabric shapes 62 that are cut from the fabric 24. The measuring devices may include, but are not limited to, cameras that generate digital images that may be compared against predetermined patterns. Lasers and devices that rely on lasers also may be employed. As should be apparent to those skilled in the art, there are a number of different devices that may be employed to assess the shape and measure the accuracy of the size of the fabric shapes 62 cut from the fabric 24.

In addition, the layup table robot 30 may include a cutting device to cut the fabric shapes 62 from the fabric 24. It is contemplated, for example, that the layup table robot 30 may include a laser that cuts the fabric 24 into one or more fabric shapes 62. Mechanical cutting tools also may be employed without departing from the scope of the present invention.

The layup table robot 30 and the mold robot 32 also may include devices that determine the orientation of the fibers within the fabric 24 to assure that the fibers are aligned along a predetermined axis. As should be apparent to those skilled in the art, when layers of fabric 24 are stacked on top of one another, the lie (or orientation) of the fibers between layers typically will not align along the same axis. This is intentional. When the fiber directions are different between layers, the aircraft component made from the fabric 24 will exhibit a higher strength if fiber orientation is prominent in the axial directions for which increased strength is desired.

With further reference to the robots 30, 32, it is contemplated that either or both of the robots 30, 32 will be equipped with devices that assess if the fabric 24 includes any defects. Defects include, but are not limited to, stretched areas of the fabric 24, debris, distortions in the fabric 24 (including folds and other defects), and holes or tears in the fabric 24. Where defects are found, the fabric 24 may be rejected as defective. Alternatively, the fabric handling apparatus 10 may determine that it is possible to use the undamaged parts of the fabric 24 and discard, as waste, the portions of the fabric 24 that include defects.

As should be apparent, the various components of the fabric handling apparatus 10 are contemplated to be connected to a computer control, which permits automated operation of the apparatus 10.

The fabric handling apparatus 10 also includes a fabric handling array 34 which, for simplicity, is omitted from FIG. 1, and is depicted in FIG. 2 (among other figures). The fabric handling array 34, which is described in greater detail in the paragraphs that follow, includes a matrix of attractors 36 that are designed to pick up the fabric 24 from the layup table 20 and release (or deposit) the fabric onto the mold 22 (or other surface). The matrix of attractors 36 may take any shape, as required or as desired for a particular installation.

In one contemplated embodiment, the attractors 36 are suction cups that are connected to a suction source 38 (also referred to as a vacuum source 38). The vacuum source 38 may be located in or near a control cabinet 40 that is disposed at the periphery of the building 12. It is noted, however, that the suction source 38 need not be located in or near the control cabinet 40 to practice the present invention. To the contrary, the suction source 38 may be disposed at a disparate location from the control cabinet 40. As should be apparent to those skilled in the art, the vacuum source 38 and the control cabinet 40 may be positioned at any suitable, alternative location (either together or apart from one another) without departing from the scope of the present invention.

It is contemplated that the attractors 36 may operate by channeling a vacuum or suction therethrough. Alternatively, as should be apparent to those skilled in the art, it is contemplated that that the attractors 36 may operate based on the Coanda principle. Specifically, suction may be generated by a device incorporating a Coanda gripper. A Coanda gripper uses a stream (or jet) of a gas, such as air, to generate suction using the Coanda effect. In brief, the Coanda effect (named after its discoverer, Henri Coanda) is the tendency of a fluid jet to attach itself to a nearby surface. The operation of a Coanda gripper device is known to those skilled in the art and, therefore, is not described in detail herein. Moreover, as noted, the device that generates the suction (or vacuum) is not critical to the present invention.

The gas is contemplated to be provided from a pressurized source. However, the pressurized gas may be generated by a pump or other suitable device. The exact method or apparatus that generates the pressurized gas is not considered to be critical to the operation of the present invention.

In another embodiment, it is contemplated that the attractors 36 may be electrostatic devices that pick up the fabric 24 using electrostatic force. In still another contemplated variation, the attractors 36 may be mechanical devices or any other suitable lifting devices designed to pick up the fabric 24 so that the fabric 24 may be transferred to the mold 22. In other words, while the present invention contemplates that the attractors 36 are suction cups, any other lifting device(s) may be employed without departing from the scope of the present invention.

In a further contemplated embodiment, the attractors 36 may operate via electrostatic principles and be connected to one another via a mat of material. In other words, the array of attractors 36 may present a continuous, flexible surface that may pick up the fabric 24. In this regard, the attractors 36 may be discrete elements that are embedded in the mat. Alternatively, the mat may define separate electrostatic regions that may be activated individually to pick up the fabric 24.

With continued reference to FIGS. 1 and 2, the fabric handling array 34 is suspended from two overhead rails 42, 44. In turn, the overhead rails 42, 44 are mounted atop two gantry rails 46, 48. The gantry rails 46, 48 are mounted atop six stanchions 50, which are mounted on the floor of the building 12. The gantry rails 46, 48 and the stanchions 50 are contemplated to be secured in fixed locations. The overhead rails 42, 44, however, may move along the lengths of the gantry rails 46, 48, as required or desired, to operate the fabric handling apparatus 10.

Figure 3:
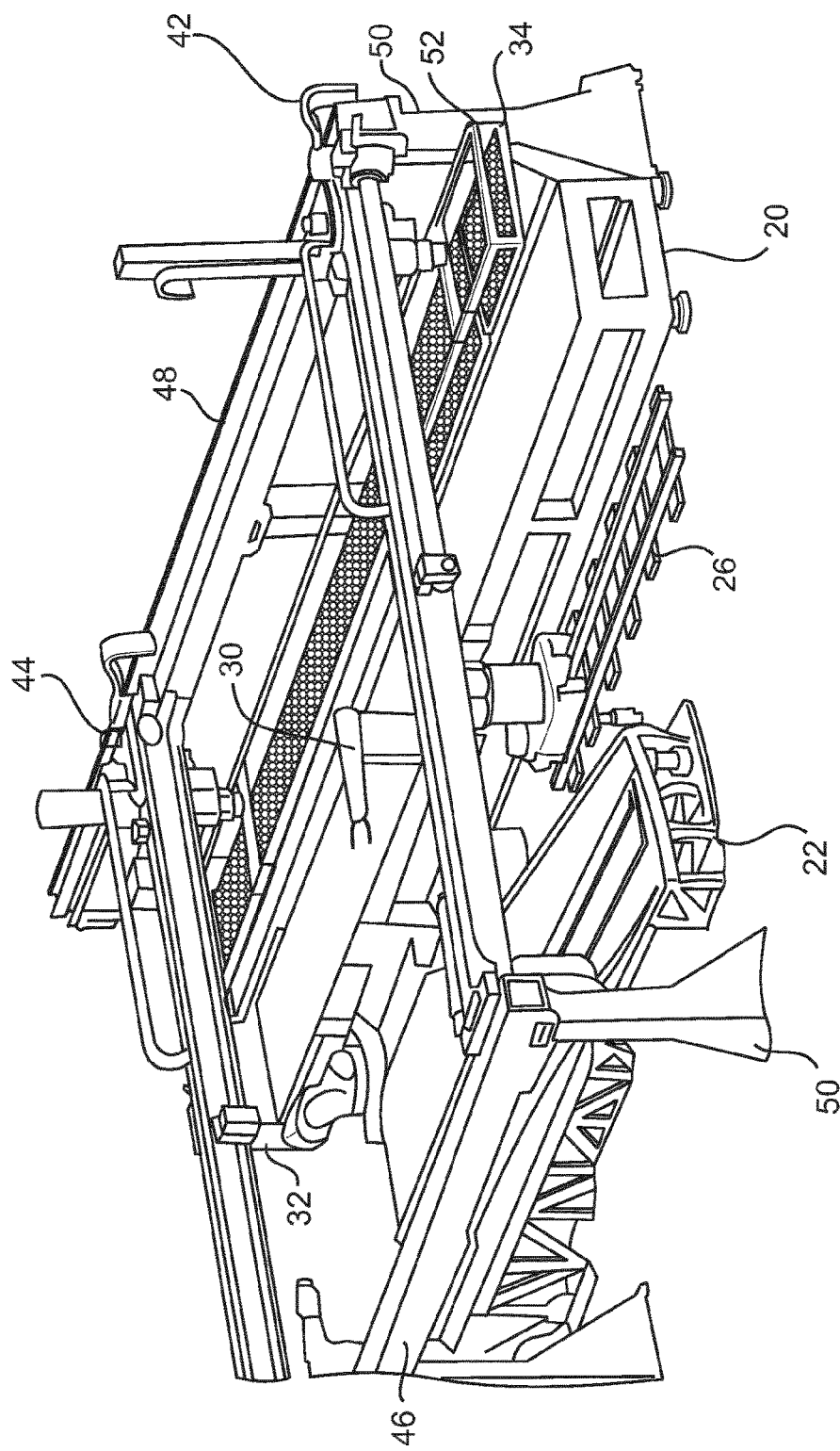
FIG. 3 is a second perspective illustration of the fabric handling apparatus that is shown in FIG. 1.

FIG. 3 is a perspective illustration of a slight variation of the fabric handling apparatus 10 that is depicted in FIGS. 1 and 2. In this embodiment, the two tracks 26, 28 and robots 30, 32 are positioned between the layup table 20 and the mold 22. In this embodiment, the robots 30, 32 are positioned so that they may operate on the fabric 24 on either of the layup table 20 or the mold 22. As illustrated, the each robot 30, 32 is dedicated to one half of each of the layup table 20 and the mold 22.

As should be apparent to those skilled in the art, the configuration illustrated in FIG. 3 suggests that there are a large number of different configurations for the robots 30, 32 and the tracks 26, 28 that may be employed for the fabric handling apparatus 10 of the present invention. As such, the fabric handling apparatus 10 of the present invention should not be understood to be limited to the embodiments that are depicted in FIGS. 1-3.

Figure 4:
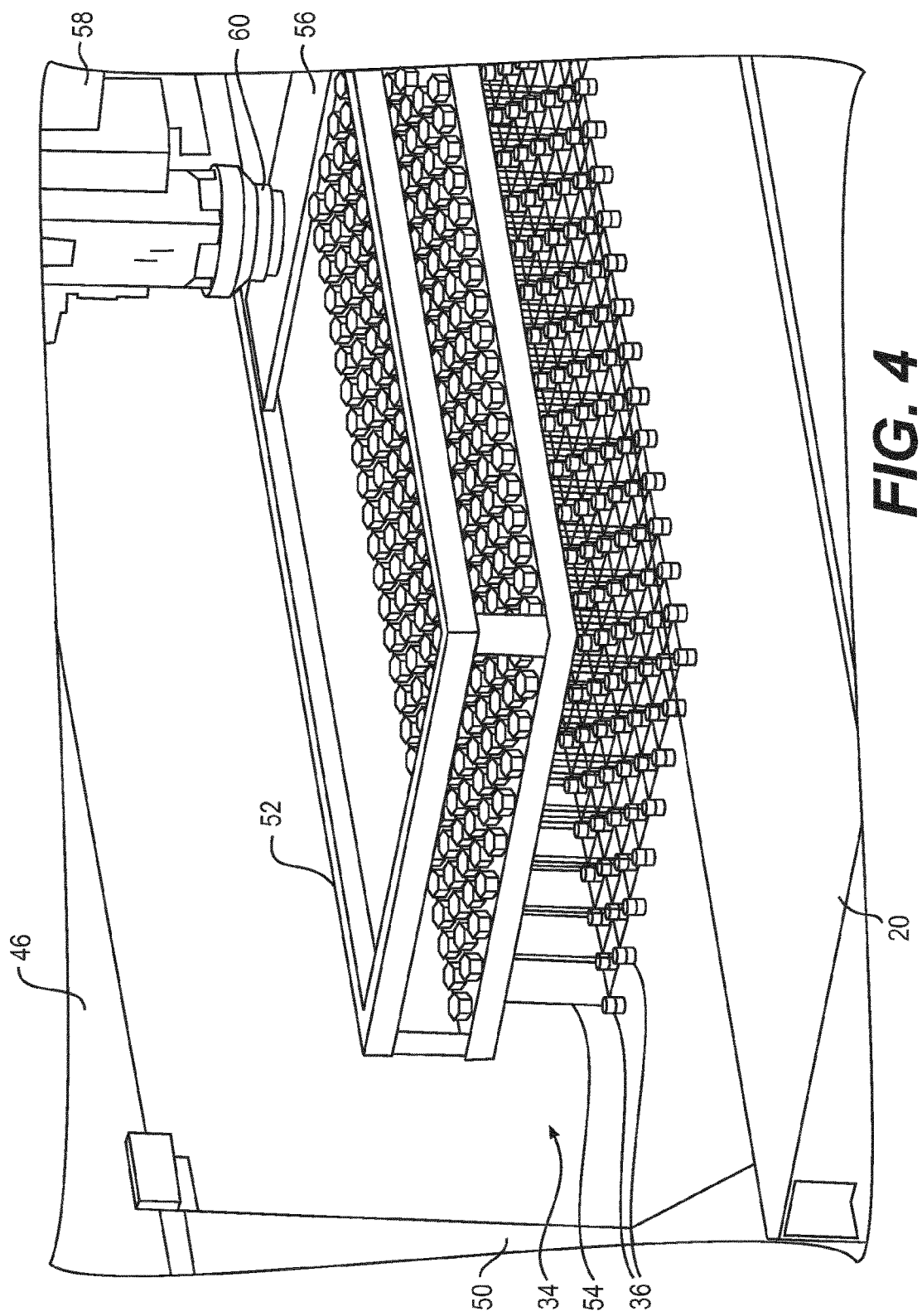
FIG. 4 is a perspective illustration of a portion of a fabric handling array that forms a part of the fabric handling apparatus depicted in FIG. 1.

FIG. 4 is a perspective illustration of the fabric handling array 34 that is discussed in connection with FIGS. 1-3. The fabric handling array 34 includes a rectangular frame 52 from which the attractors 36 are suspended. Each attractor 36 is contemplated to be suspended by a cable 54 from the frame 52. The construction of the attractors 36 and the cables 54 is provided in greater detail below.

The frame 52 is connected to a cross-brace 56 that is connected, in turn, to a frame handler 58. The frame handler 58 moves along one of the overhead rails 42, 44 so that the fabric 24 may be transferred from the layup table 20 to the mold 22. In addition, the frame handler 58 is connected to the crossbrace 56 via a pivot 60. The pivot 60 permits the frame 52 to rotate with respect to the orientation of the layup table 20 and the mold 22, as discussed in greater detail in connection with FIGS. 5-19.

With reference to FIG. 2, it is noted that, in the illustrated embodiment, the frame 52 and the fabric handling array 34 are contemplated to be suspended at two points, one at each of the overhead rails 42, 44. As should be apparent, the present invention is not intended to be limited to a construction with two overhead rails 40, 42. A single overhead rail 40, 42 or a plurality of overhead rails 40, 42 may be employed without departing from the scope of the present invention.

Before discussing FIGS. 5-19, it is noted that the overhead rails 42, 44 are contemplated to move or translate along the gantry rails 46, 48. As noted, the fabric handling array 34 is rotatable via the pivots 60. In addition, the attractors 36 are moveable in a direction vertically by changing the lengths of the cables 54 from which the attractors 36 are suspended. When these motions are taken together with the motion of the overhead rails 40, 42 along the gantry rails 46, 48, it is noted that the attractors 36 are provided with considerable freedom of motion with respect to both the layup table 20 and the mold 22. The wide range of motion available to the plurality of attractors 36 facilitates operation of the fabric handling apparatus 10, as detailed in part in connection with FIGS. 5-19.

FIGS. 5-19 will now be discussed in connection with two contemplated modes of operation of the fabric handling apparatus 10 of the present invention. FIGS. 5-10 help to explain a first operation of the fabric handling apparatus 10 where a single fabric shape 62 is transferred from the layup table 20 to the mold. FIGS. 11-19 help to explain a second operation of the fabric handling apparatus 10 of the present invention where a plurality of fabric shapes 62 are transferred from the layup table 20 to the mold 22.

It is noted that the discussion of these two modes of operation are intended to illustrate contemplated modes of operating the fabric handling apparatus 10 of the present invention. The discussion of these two modes of operation is not intended to be limiting of the present invention.

Figure 5:
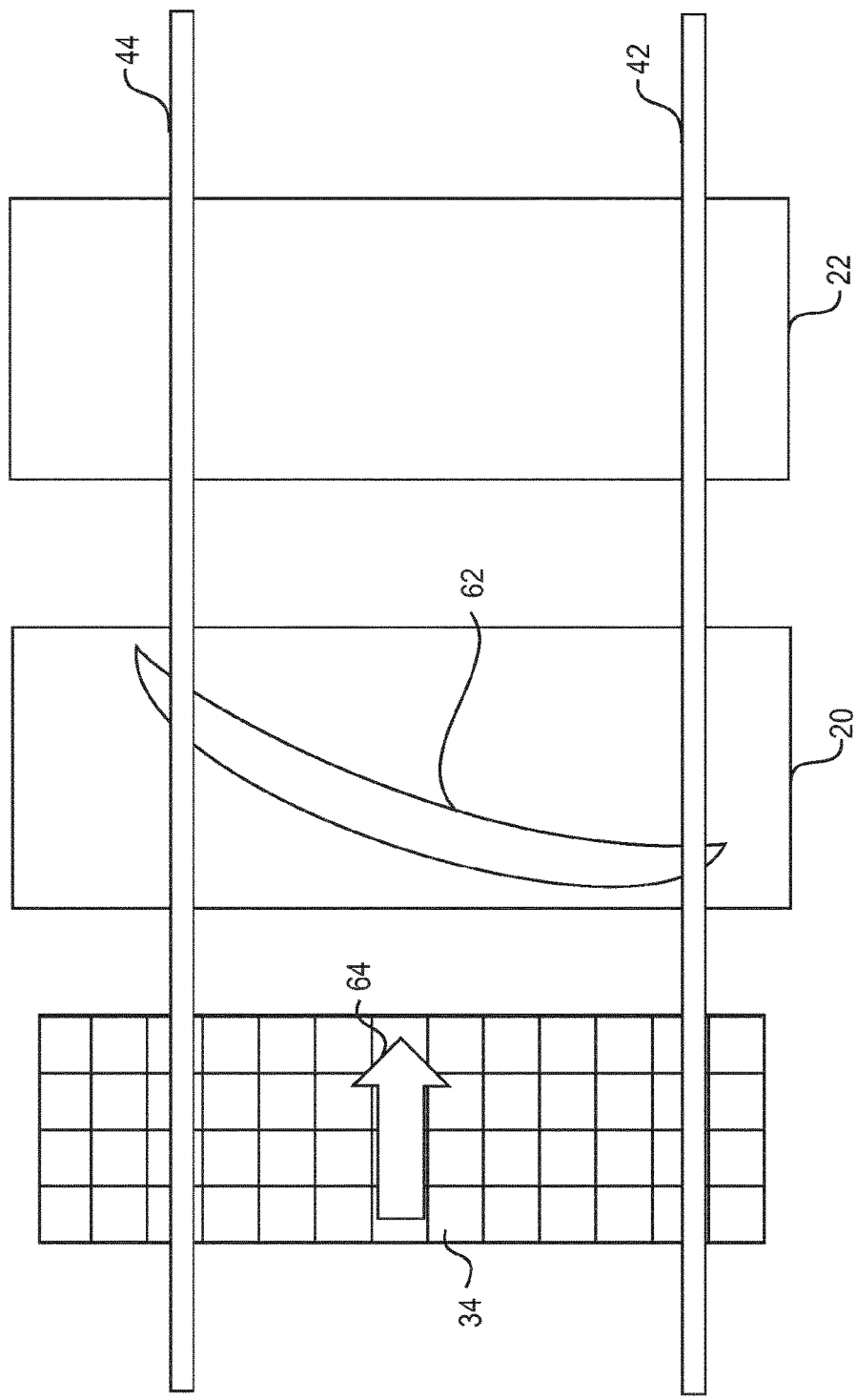
FIG. 5 is a graphical illustration of a portion of the fabric handling apparatus illustrated in FIG. 1, showing a first state of the fabric handling apparatus in a first sequence of operation.

FIG. 5 is a graphical, top view of the fabric handling apparatus 10 of the present invention, showing the fabric handling apparatus 10 in a first state of a first sequence of operation. In this first state, the fabric handling array 34 is suspended above and adjacent to the layup table 20. The fabric 24 has been cut into a single fabric shape 62, which appears as an extended crescent shape on the layup table 20. From this first state of operation, the fabric handling array 34 moves in the direction of the arrow 64 over the fabric shape 62 on the layup table 20.

Figure 6:
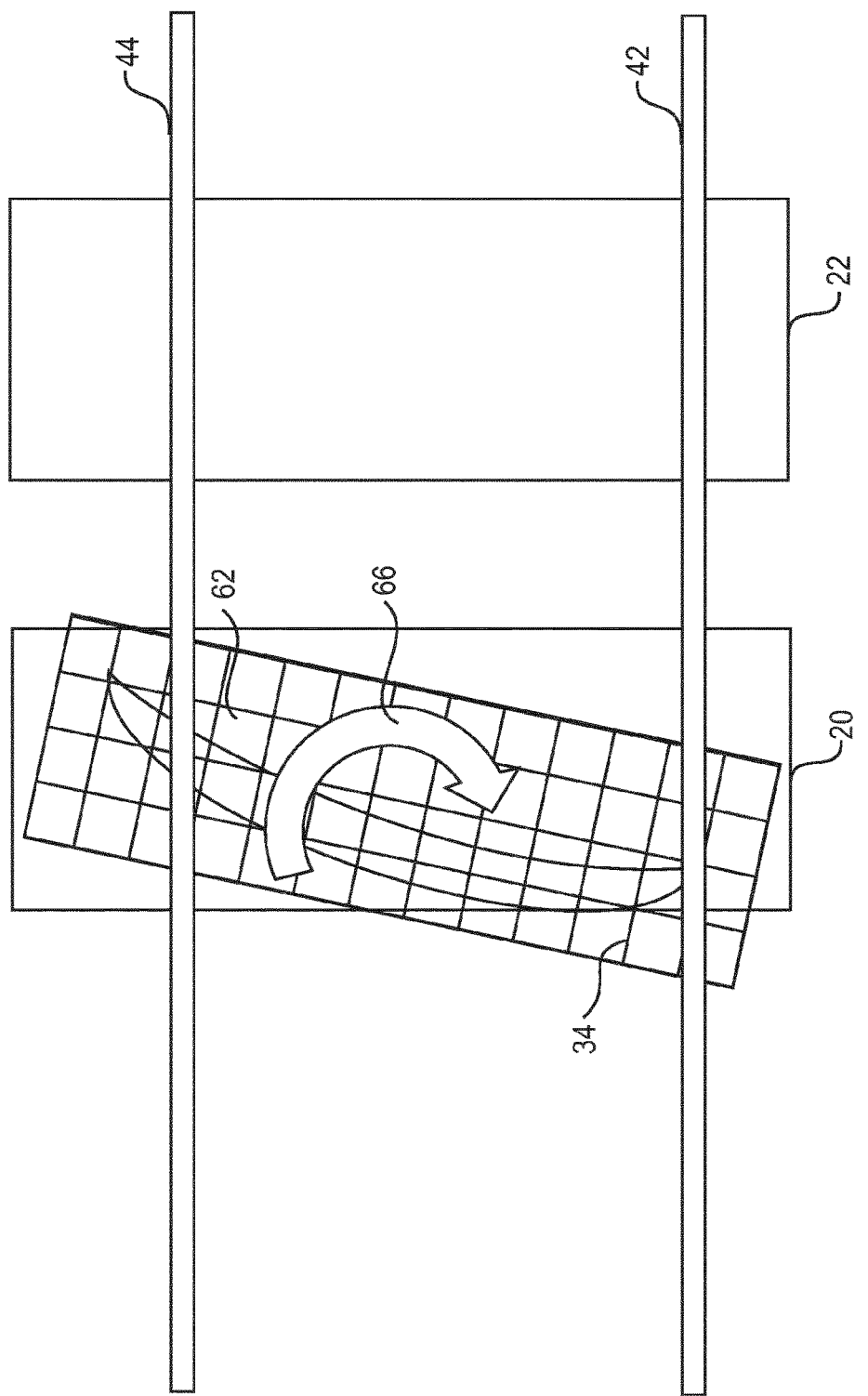
FIG. 6 is a graphical illustration of a portion of the fabric handling apparatus illustrated in FIG. 1, showing a second state of the fabric handling apparatus in the first sequence of operation.

FIG. 6 is a top, graphical illustration of a second state of the fabric handling apparatus 10 in the first sequence of operation. In this second state, the fabric handling array 34 has been moved to a position above the layup table 20. In addition, the fabric handling array 34 has been rotated with respect to the layup table 20. The rotation of the fabric handling array 34 is indicated by the arrow 66.

By rotating the fabric handling array 34 in the direction of the arrow 66, the fabric handling array 34 is oriented so that the fabric shape 62 extends longitudinally along the length of the fabric handling array 34. This facilitates transport of the fabric shape 62 to the mold 22. The rotation of the fabric handling array 34 also facilitates orientation of the fabric shape 62 on the mold 22.

In the alternative, the fabric handling array 34 may be operated so that the fabric handling array 34 picks up the fabric shape 62 in the orientation shown in FIG. 5. In this alternative mode of operation, the rotational position of the fabric handling array 34 may be adjusted during transit to the mold 22 so that the fabric shape 62 is in the correct orientation before being deposited on the mold 22. Still further, the rotational position of the fabric handling array 34 may be adjusted after the fabric handling array 34 has been moved to the location of the mold 22 and is suspended thereover.

Figure 7:
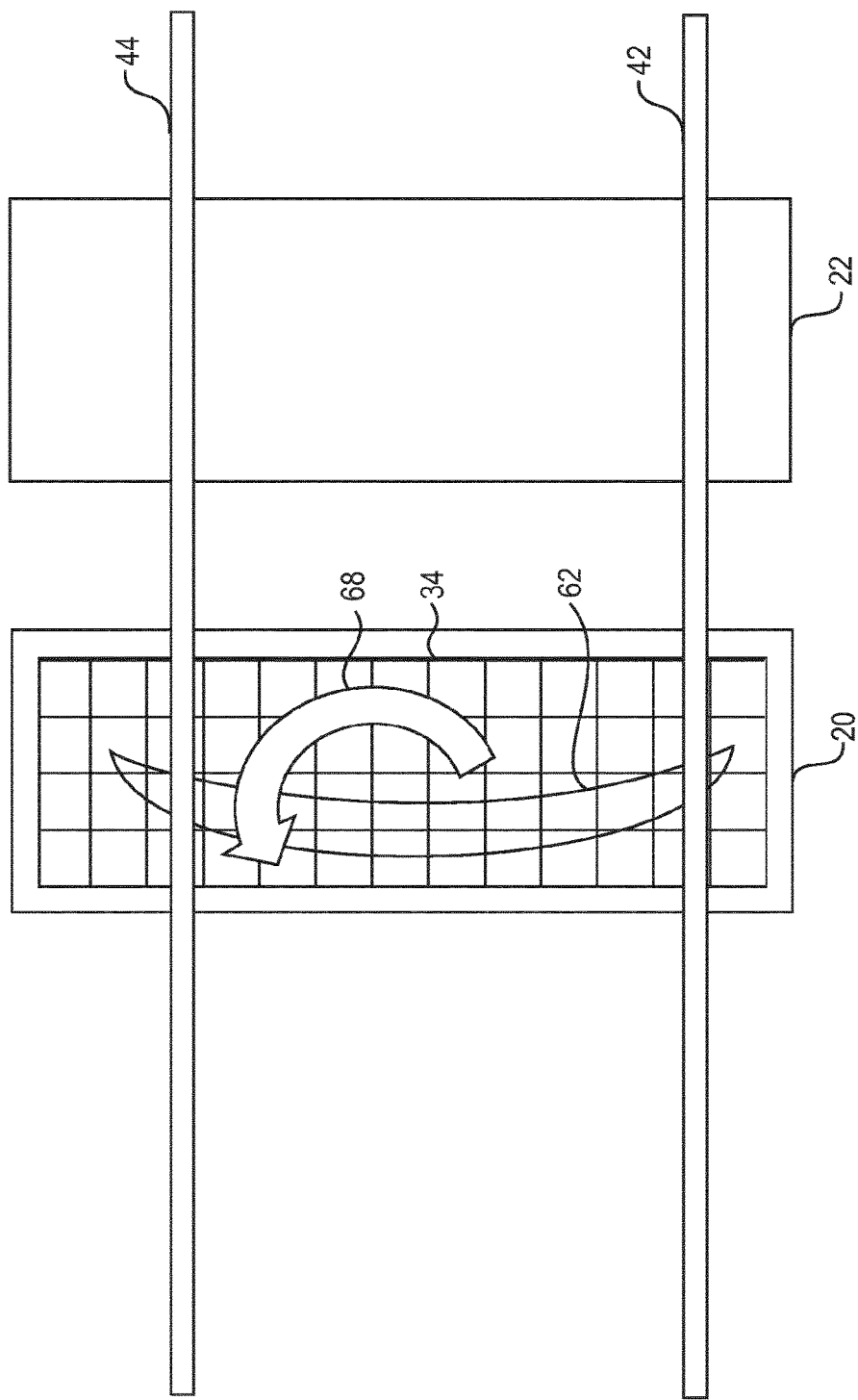
FIG. 7 is a graphical illustration of a portion of the fabric handling apparatus illustrated in FIG. 1, showing a third state of the fabric handling apparatus in the first sequence of operation.

FIG. 7 is a top, graphical representation of a third state of the first sequence of operation of the fabric handling apparatus 10. In this illustration, the fabric handling array 34 has been counter-rotated in the direction of the arrow 68. As illustrated, the fabric handling array 34 has been realigned with the layup table 20. In addition, the attractors 36 have engaged the fabric shape 62. As a result, when the fabric handling array 34 is rotated in the direction of the arrow 68, the rotational position of the fabric shape 62 is reoriented in the direction of the arrow 68.

Figure 8:
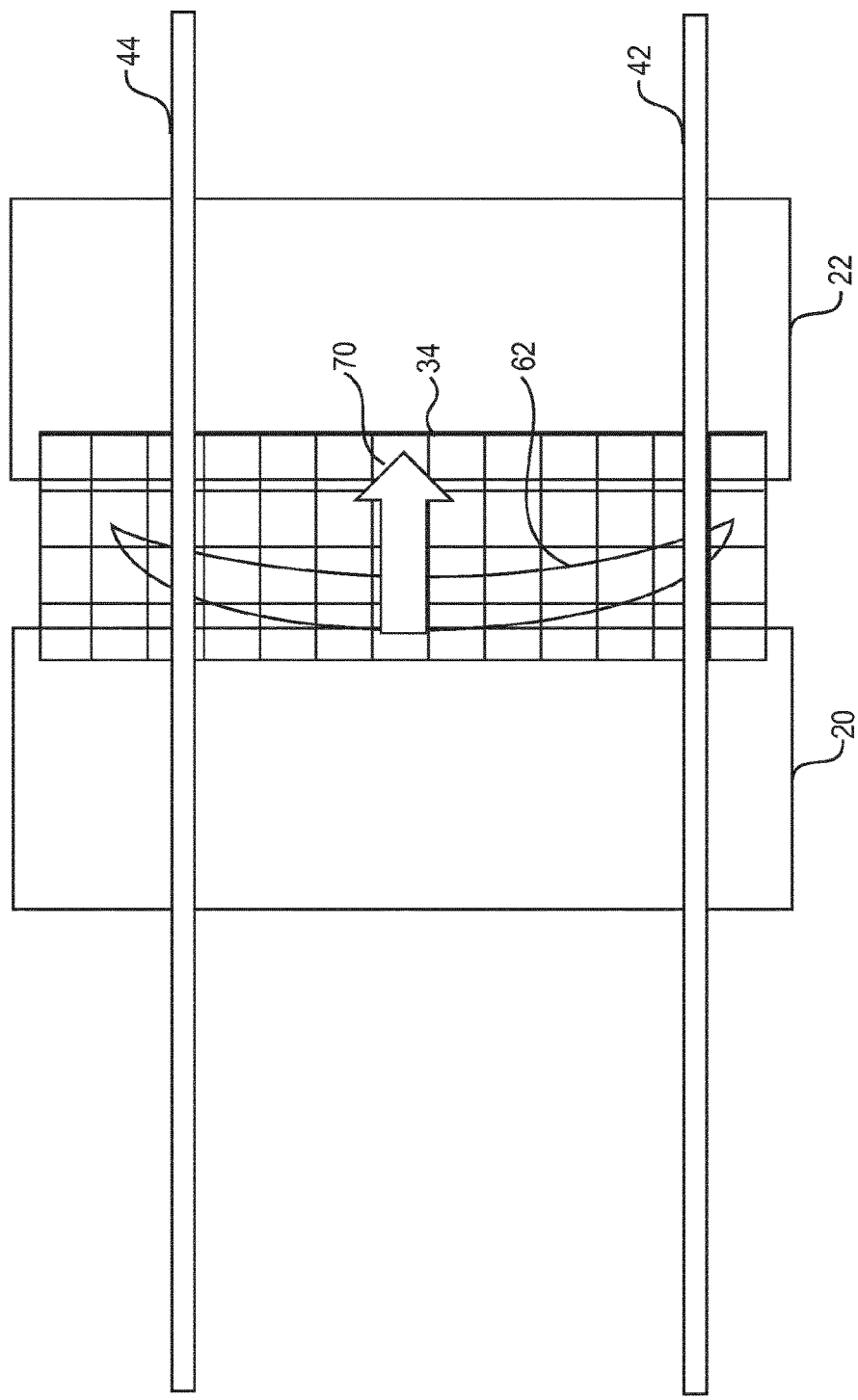
FIG. 8 is a graphical illustration of a portion of the fabric handling apparatus illustrated in FIG. 1, showing a fourth state of the fabric handling apparatus in the first sequence of operation.

FIG. 8 is a top, graphical representation of a fourth state of the first sequence of operation of the fabric handling apparatus 10 of the present invention. In this illustration, the fabric handling array 34 is midway in its travel between the layup table 20 to the mold 22. As indicated, the fabric handling array 34 travels in the direction of the arrow 70.

Figure 9:
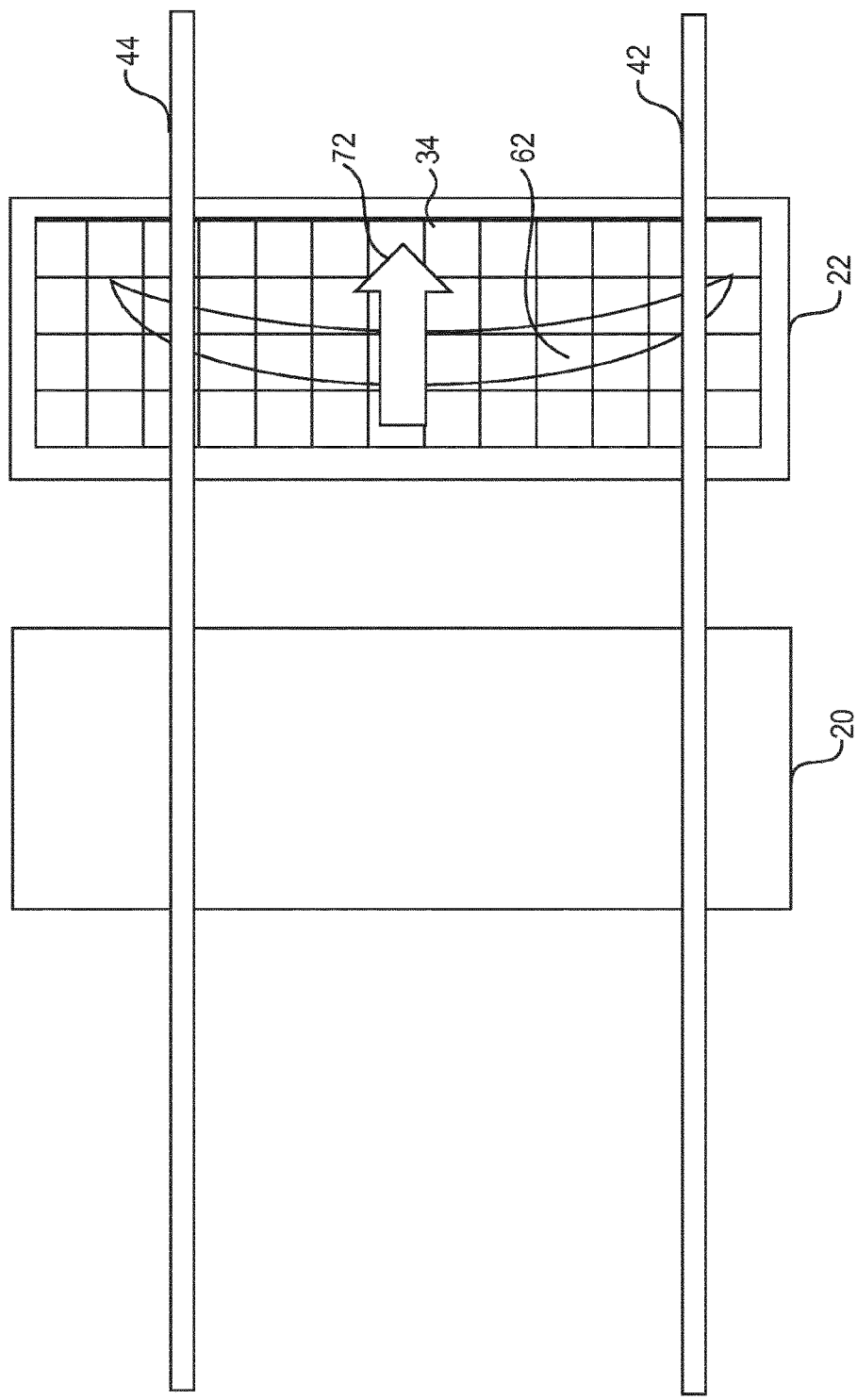
FIG. 9 is a graphical illustration of a portion of the fabric handling apparatus illustrated in FIG. 1, showing a fifth state of the fabric handling apparatus in the first sequence of operation.

FIG. 9 is a top, graphical representation of a fifth state of the first sequence of operation of the fabric handling apparatus 10 of the present invention. In this view, the fabric handling array 34 has been moved in the direction of the arrow 72 so that the fabric handling array 34 is positioned over the mold 22. Once in this position, the fabric attractors 36 are lowered so that the fabric shape 62 may be deposited, in the predetermined position, on the mold 22. The attractors then release the fabric shape 62 and retract to a neutral position within the fabric handling array 34.

Figure 10:
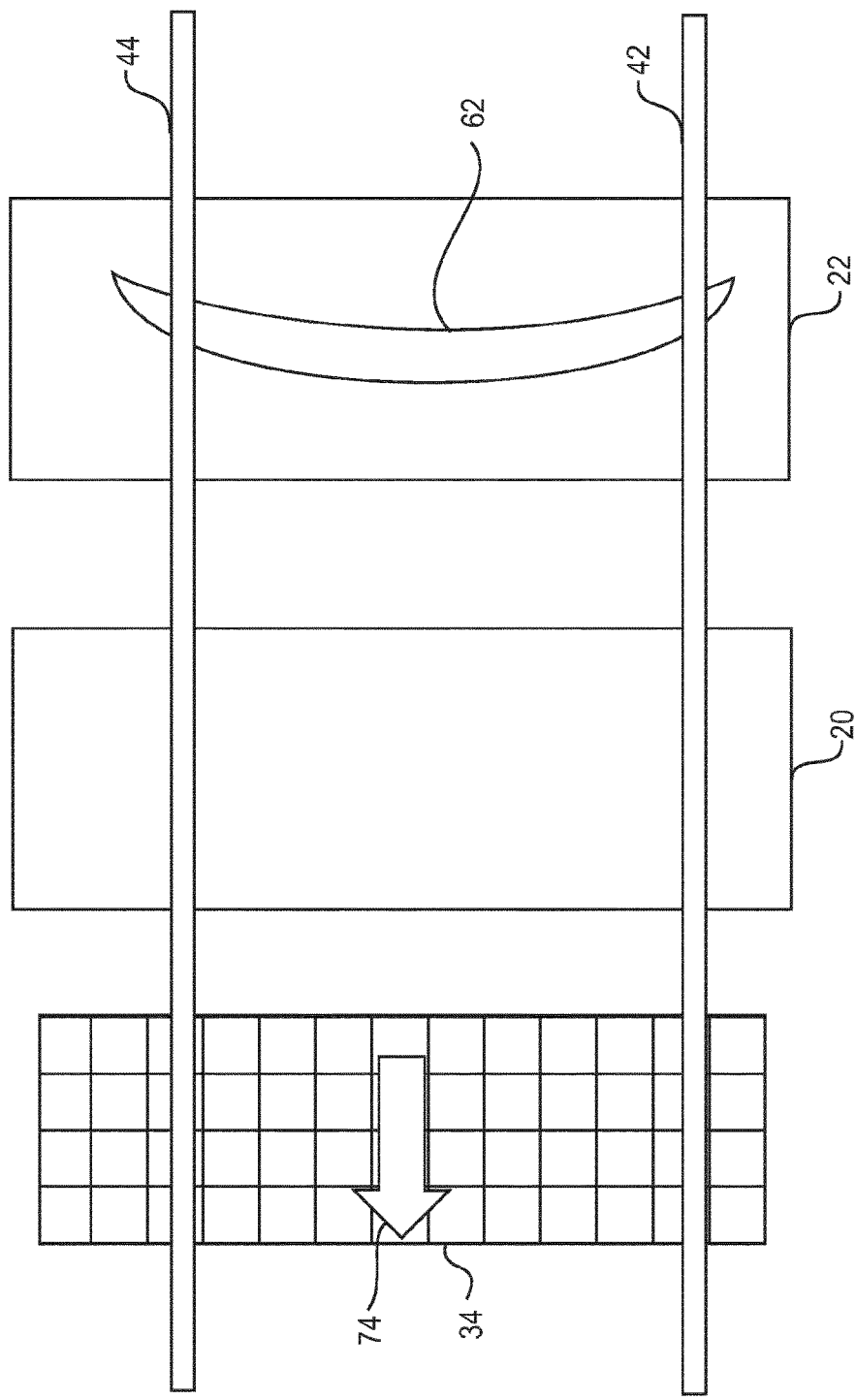
FIG. 10 is a graphical illustration of a portion of the fabric handling apparatus illustrated in FIG. 1, showing a sixth state of the fabric handling apparatus in the first sequence of operation.

FIG. 10 is a top, graphical representation of a sixth state of the first sequence of operation of the fabric handling apparatus 10 of the present invention. In this illustration, the fabric shape 62 is shown after having been deposited on the mold 22. The fabric handling array 34 has returned to its initial (or first) position adjacent to the layup table 20, as indicated by the arrow 74. From this position, the fabric handling array 34 is in an initial state and is positioned to repeat the steps outlined above for the first sequence of operation of the fabric handling apparatus 10.

In connection with FIGS. 5-10, for simplicity, the operation of the fabric handling array 34 has been described in connection with a single fabric shape 62. It should be understood, however, that the fabric handling array 34 may pick up and transfer several fabric shapes 62 from the layup table 20 and transfer the several fabric shapes to the mold 22 simultaneously.

In a further contemplated embodiment, the fabric handling array 34 may pick up multiple fabric shapes 62 at one time. However, the fabric handling array 34 may deposit only one or more of the fabric shapes 62 at a time. In other words, the fabric handling array 34 may be adjusted in its orientation with respect to the mold 22 before each individual fabric shape 62 is deposited on the surface of the mold 22 (or the immediately preceding layer of fabric).

As noted above, the orientation 76 of the fibers in the fabric 24 may play a role in the positioning of the fabric shape 62 on the mold. The orientation 76 of the fibers in the fabric 24, therefore, may provide input for the operation of the fabric handling apparatus 10.

FIGS. 11-19 are provided to explain this second sequence of operation of the fabric handling apparatus of claim 10. In this second sequence of operation, the fabric handling array 34 lifts several fabric shapes 62 at the same time. At the mold 22, the fabric handling array 34 deposits each fabric shape 62 separately to assure that the fabric shape 62 is deposited in the predetermined position on the mold 22.

Figure 11:
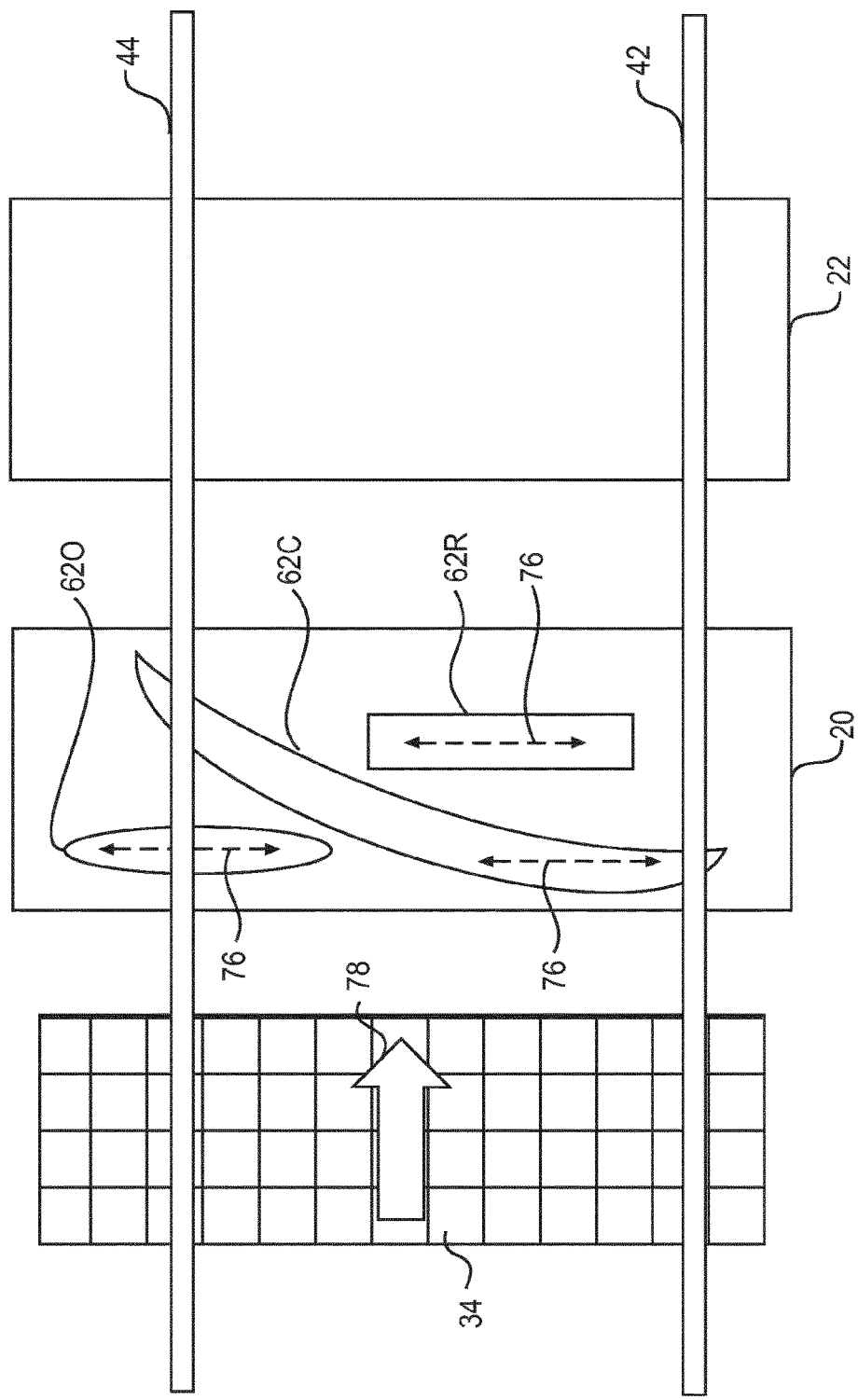
FIG. 11 is a graphical illustration of a portion of the fabric handling apparatus illustrated in FIG. 1, showing a first state of the fabric handling apparatus in a second sequence of operation.

FIG. 11 is a top, graphical representation of a first state of the second sequence of operation of the fabric handling apparatus 10 of the present invention. In the first state, the fabric handling array 34 is in an initial position adjacent to and above the layup table. This first state is the same as the first state illustrated in FIG. 5.

As should be apparent in this drawing, instead of a single fabric shape 62 on the layup table 20, there are three fabric shapes 62O (an oval shape), 62C (the crescent shape discussed above), and 62R (a rectangular shape). It should be understood that, in this illustrated embodiment, each of the three fabric shapes 62O, 62C, 62R were cut from the same piece of fabric and, therefore share the same orientation 76. In particular, it should be understood that each of the three fabric shapes 62O, 62C, 62R have fibers that are all oriented in the same direction, as indicated by the axes 76.

In each of FIGS. 11-19, the axis 76 of the orientation of the fibers in the fabric shapes 62O, 62C, 62R is illustrated as being perpendicular to the longitudinal axes of the overhead rails 42, 44. As should be apparent, this particular orientation has been selected to facilitate discussion of the operation of the fabric handling apparatus 10. The axes 76 may be disposed at any orientation with respect to the overhead rails 42, 44 without departing from the scope of the present invention.

As also should be apparent, from its initial position, the fabric handling array 34 travels in the direction of the arrow 78 until the fabric handling array 34 is positioned above the layup table 20. Once positioned above the layup table 20, the fabric handling array 34 may pick up one or more of the fabric shapes 62O, 62C, 62R.

Figure 12:
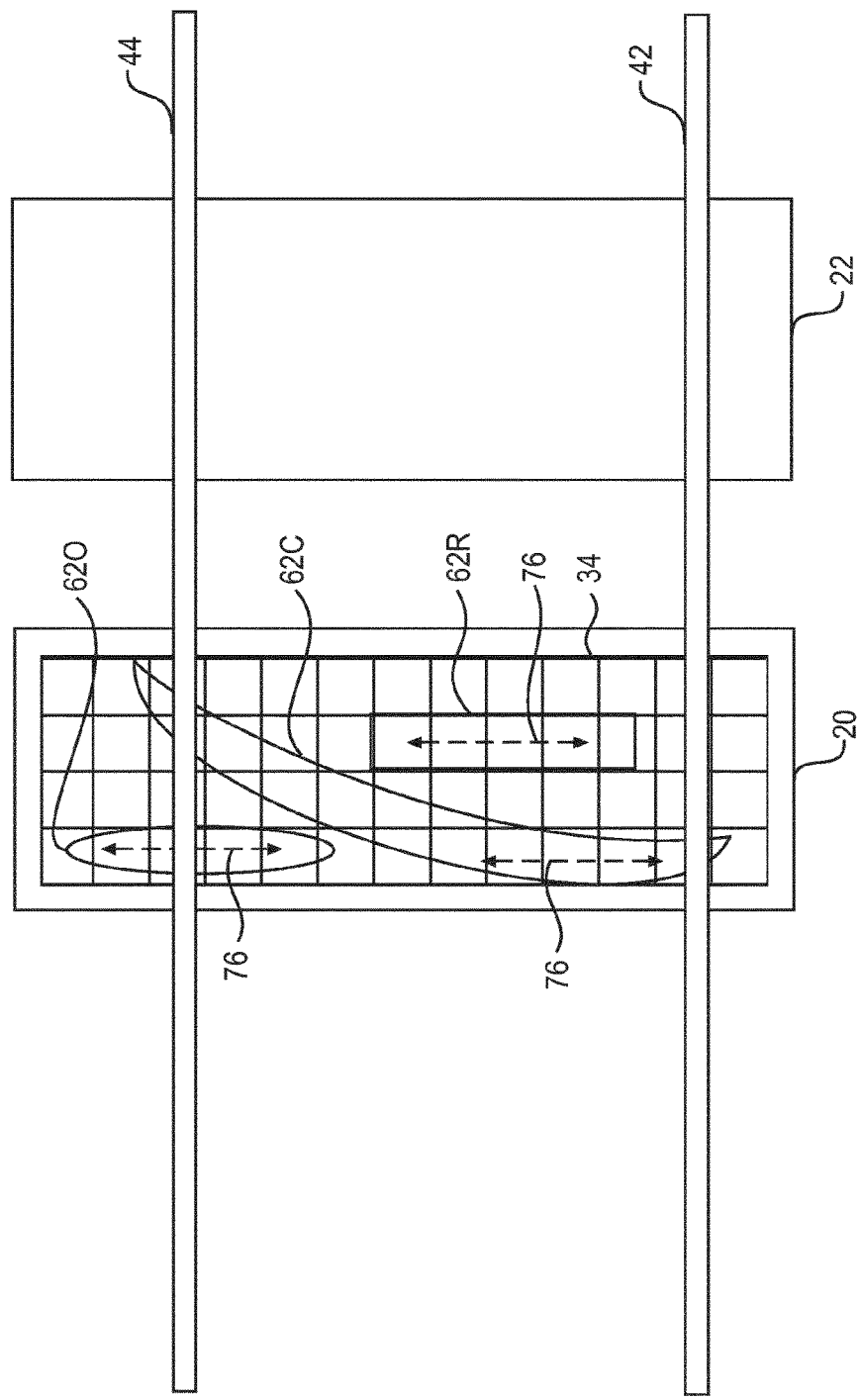
FIG. 12 is a graphical illustration of a portion of the fabric handling apparatus illustrated in FIG. 1, showing a second state of the fabric handling apparatus in the second sequence of operation.

FIG. 12 is a top, graphical representation of a second state of the second sequence of operation of the fabric handling apparatus 10 of the present invention. In this second state, the fabric handling array 34 is positioned over the layup table 20 and may pick up one or more of the fabric shapes 62O, 62C, 62R.

Figure 13:
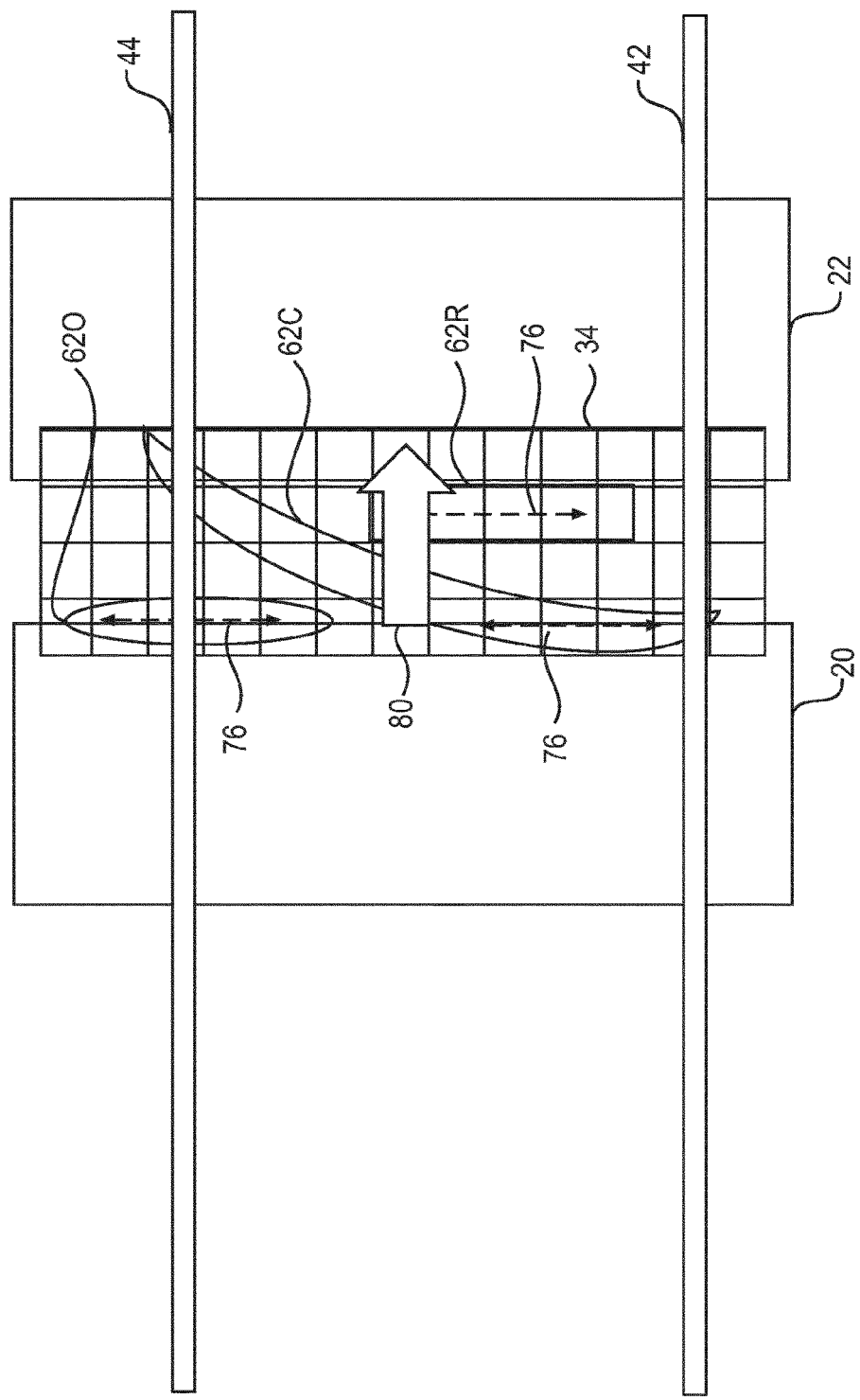
FIG. 13 is a graphical illustration of a portion of the fabric handling apparatus illustrated in FIG. 1, showing a third state of the fabric handling apparatus in the second sequence of operation.

FIG. 13 is a top, graphical representation of a third state of the second sequence of operation of the fabric handling apparatus 10 of the present invention. In this illustration, the fabric handling array 34 has moved to a position intermediate to the layup table 20 and the mold 22 in the direction of the arrow 80. As shown in this view, the attractors 36 that make up the fabric handling array 34 have picked up all three of the fabric shapes 62O, 62C, 62R.

Figure 14:
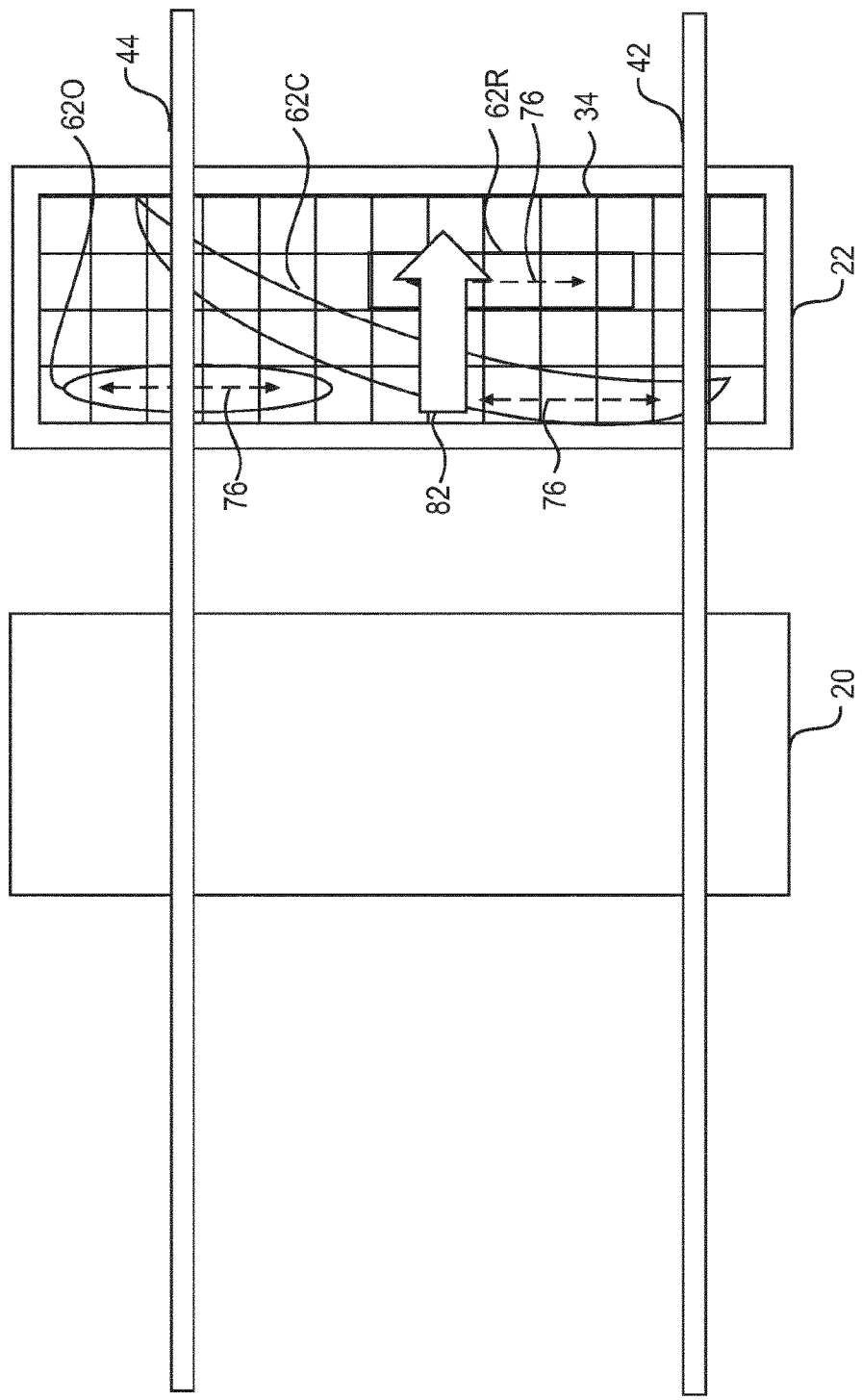
FIG. 14 is a graphical illustration of a portion of the fabric handling apparatus illustrated in FIG. 1, showing a fourth state of the fabric handling apparatus in the second sequence of operation.

FIG. 14 is a top, graphical representation of a fourth state of the second sequence of operation of the fabric handling apparatus 10 of the present invention. In this fourth state, the fabric handling array 34 has moved to a position above the mold 22, along the direction of the arrow 82. At this position, the fabric handling array 34 may deposit one or more of the fabric shapes 62O, 62C, 62R onto the mold.

For purposes of this discussion, only the rectangular fabric shape 62R is deposited onto the mold in this fourth state. The oval fabric shape 62O and the crescent fabric shape 62C are retained on the fabric handling array 34 by the attractors 36.

With respect to the attractors 36, it is noted that each attractor 36 is contemplated to be operated independently of the other attractors 36. As a result, it is contemplated that the attractors 36 may be controlled individually to provide the greatest amount of control and selectability with respect to the operation of the fabric handling apparatus 10 of the present invention. In particular, the magnitude of the attractive force generated by each individual attractor 36 may be controlled. In addition, the height of each individual attractor 36 also may be controlled. Where the array 34 incorporates an electrostatic mat, it is contemplated that the electrostatic force may be varied from one area of the mat to another. Moreover, the height of regions of the mat may be altered with respect to other regions of the mat, as should be apparent to those skilled in the art.

In connection with this aspect of the present invention, it is noted that only those attractors 36 that are needed to capture, lift, and transport the fabric shapes 62O, 62C, 62R from the layup table 20 to the mold 22 are contemplated to be activated at any given time. In other words, if an attractor 36 is not needed to lift any one of the fabric shapes 62O, 62C, 62R, that attractor 36 will remain deactivated during the movement of the fabric handling array 34 to the mold 22. Simply, since attractors 36 are not needed when there is no fabric shape 62O, 62C, 62R associated therewith, they do not need to be activated. The control device (such as a computer or processor), knowing the location, size, and orientation of the fabric shapes 62O, 62C, 62 R, therefore, will activate only the attractors 36 that are needed to transport the fabric shapes 62O, 62C, 62R to the mold 22.

Figure 15:
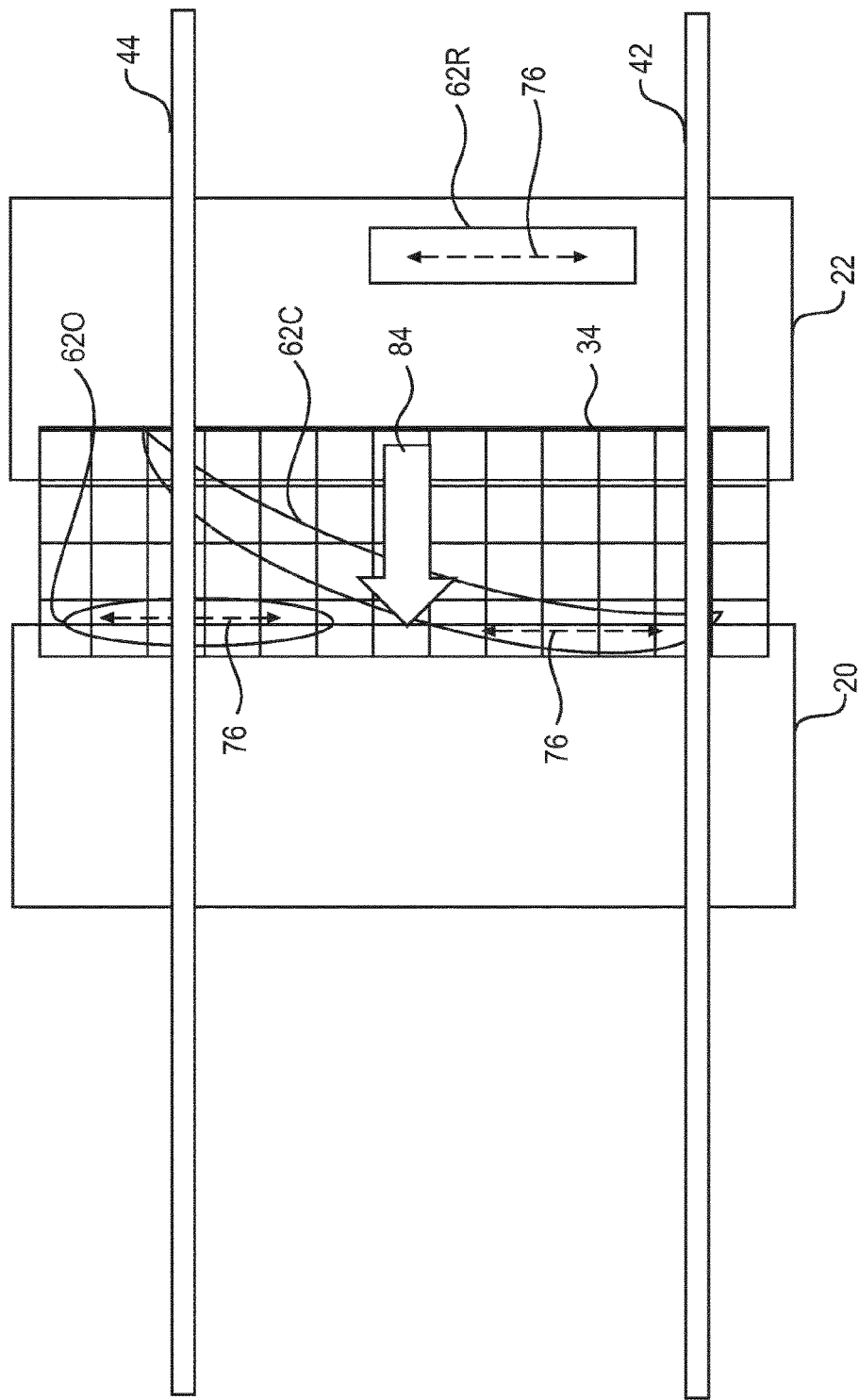
FIG. 15 is a graphical illustration of a portion of the fabric handling apparatus illustrated in FIG. 1, showing a fifth state of the fabric handling apparatus in the second sequence of operation.

FIG. 15 is a top, graphical representation of a fifth state of the second sequence of operation of the fabric handling apparatus 10 of the present invention. As illustrated in this view, the fabric handling array 34 has moved in the direction of the arrow 84 to a position intermediate to the layup table 20 and the mold 22. As indicated above, the rectangular fabric shape 62R has been left on the mold 22.

Figure 16:
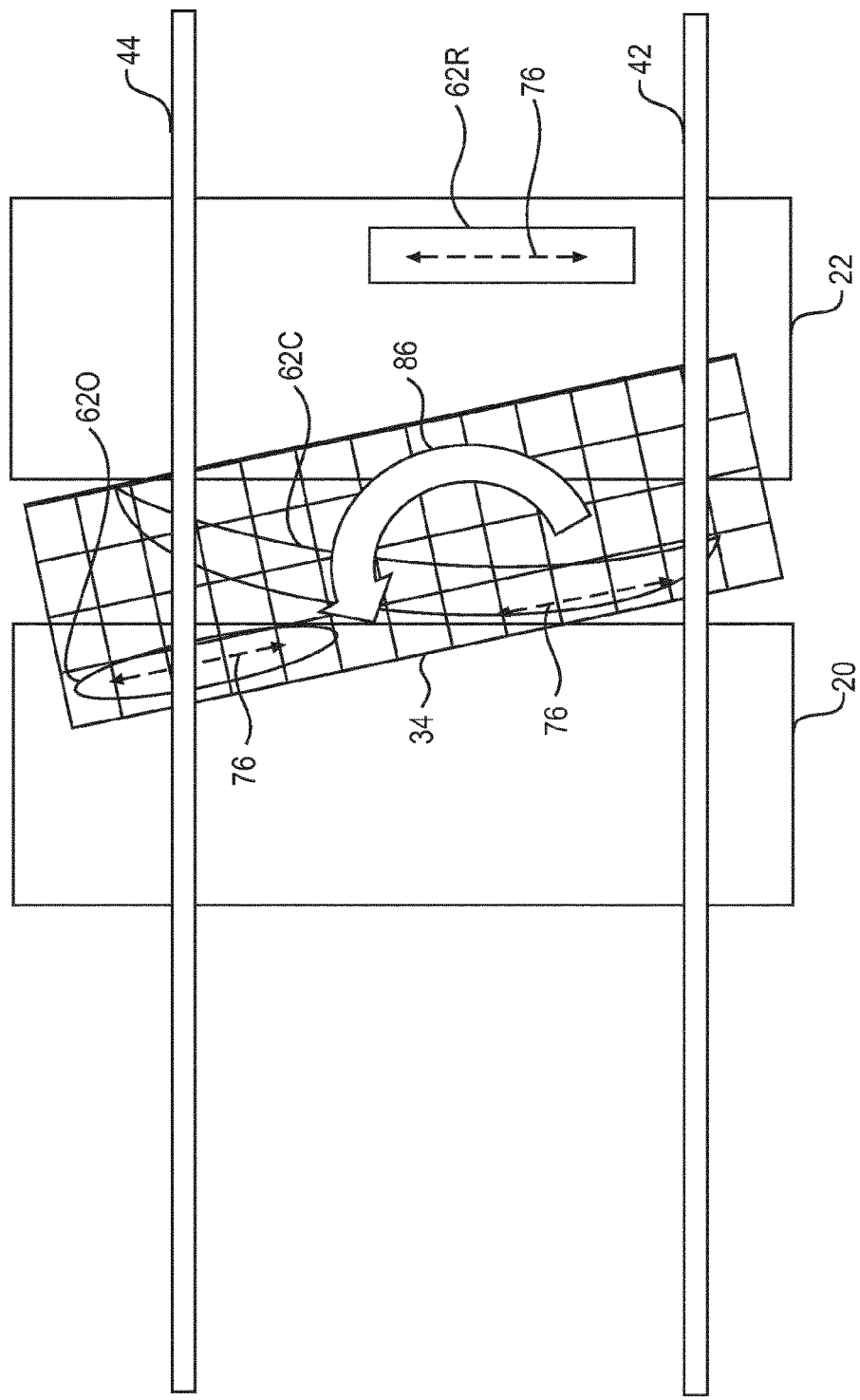
FIG. 16 is a graphical illustration of a portion of the fabric handling apparatus illustrated in FIG. 1, showing a sixth state of the fabric handling apparatus in the second sequence of operation.

FIG. 16 is a top, graphical representation of a sixth state of the second sequence of operation of the fabric handling apparatus 10 of the present invention. In this view, the fabric handling array 34 is rotated in the direction of the arrow 86. Naturally, when the rotational orientation of the fabric handling array 34 is changed, the orientation of the fabric shapes 62O, 62C that are being held by the fabric handling array 34 also change.

Figure 17:
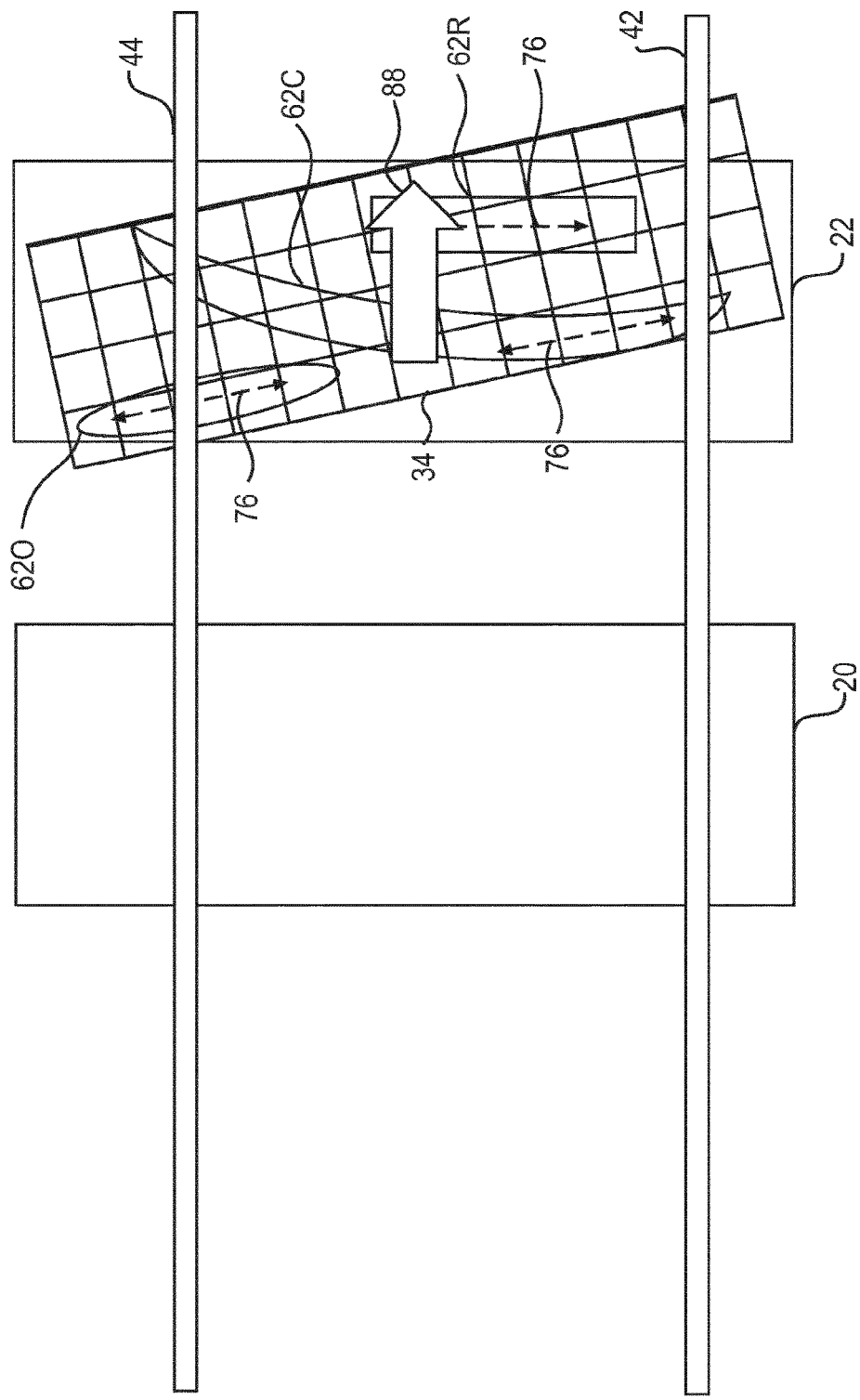
FIG. 17 is a graphical illustration of a portion of the fabric handling apparatus illustrated in FIG. 1, showing a seventh state of the fabric handling apparatus in the second sequence of operation.

FIG. 17 is a top, graphical representation of a seventh state of the second sequence of operation of the fabric handling apparatus 10 of the present invention. In this illustration, the fabric handling array 34 has moved over the mold 22 for a second time, as shown by the arrow 88. However, the fabric handling array 34 has retained the rotated position established in FIG. 16. Accordingly, the fabric shapes 62O, 62C remain in their rotated positions.

Figure 18:
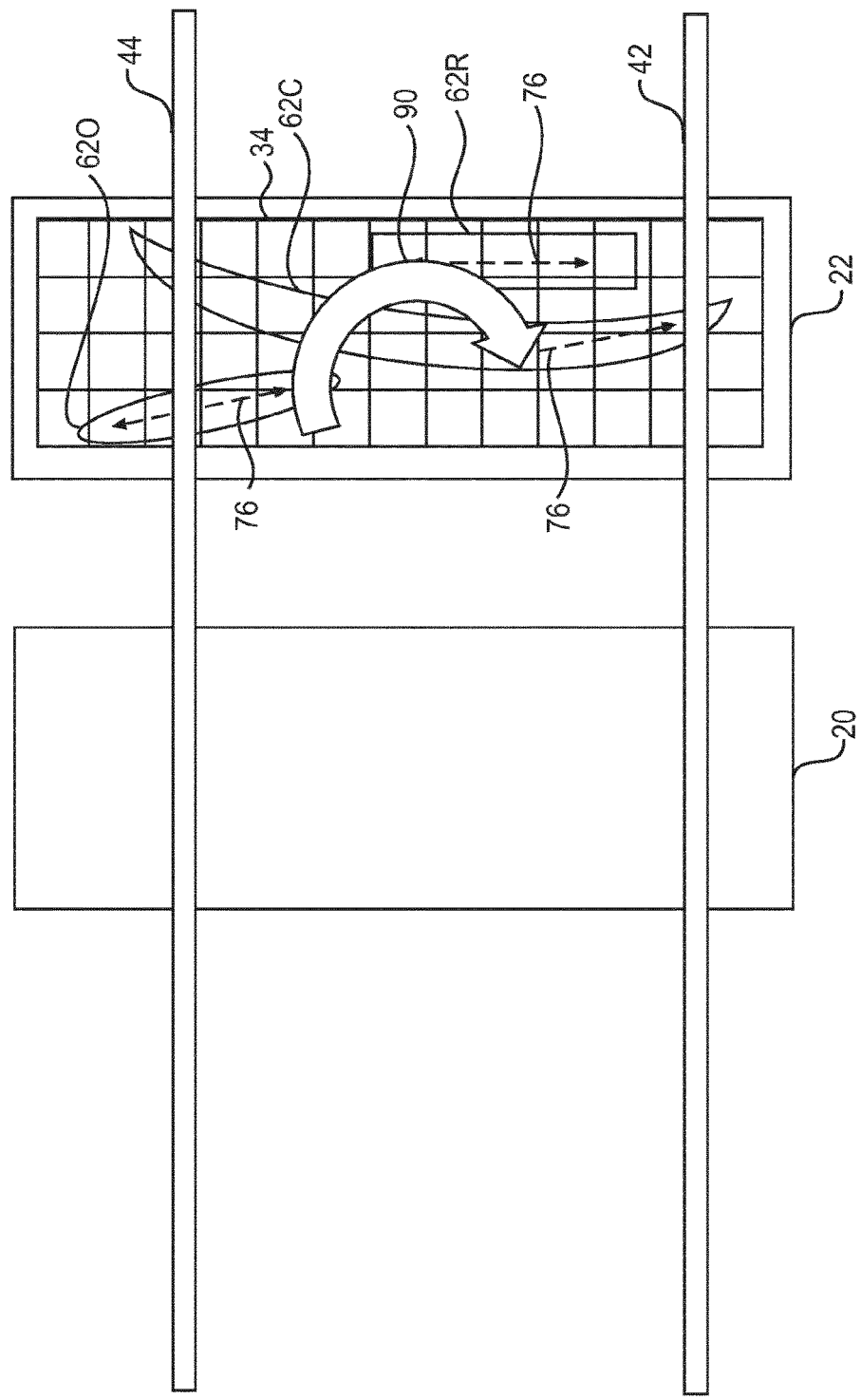
FIG. 18 is a graphical illustration of a portion of the fabric handling apparatus illustrated in FIG. 1, showing an eighth state of the fabric handling apparatus in the second sequence of operation.

FIG. 18 is a top, graphical representation of a eighth state of the second sequence of operation of the fabric handling apparatus 10 of the present invention. In this view, the fabric shapes 62O, 62C have been deposited onto the mold 22. The fabric handling array 34 has been rotated in the direction of the arrow 90 so that the fabric handling array 34 is aligned with the longitudinal axis of the mold 22.

Figure 19:
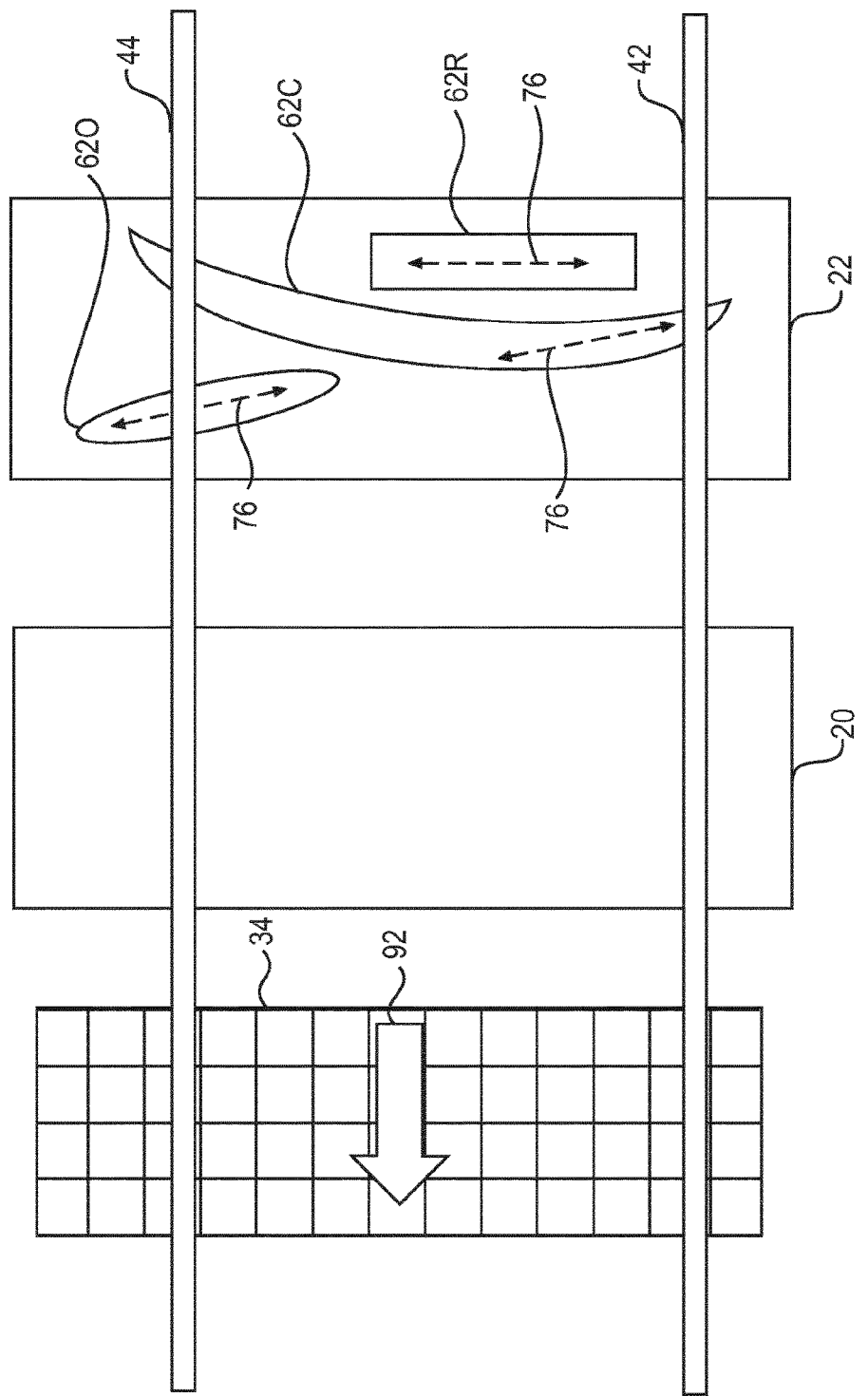
FIG. 19 is a graphical illustration of a portion of the fabric handling apparatus illustrated in FIG. 1, showing a ninth state of the fabric handling apparatus in the second sequence of operation.

FIG. 19 is a top, graphical representation of a ninth state of the second sequence of operation of the fabric handling apparatus 10 of the present invention. In this view, the fabric handling array 34 has traveled to its initial position adjacent to the layup table 20 in the direction of the arrow 92. As illustrated, all three of the fabric shapes 62O, 62C, 62R remain on the mold 22 so that they may form a part of the component being assembled in the mold 22.

As should be apparent from FIG. 19 (among other figures), the axes indicating the orientation 76 of the fibers in the fabric shapes 62O, 62C are no longer aligned with the axis 76 of the fabric shape 62R. As noted above, by changing the orientation 76 of the fibers in the fabric shapes 62O, 62C, it is possible to construct a final, composite structure where each of the layers has a slightly different fiber orientation 76. This permits construction of a component with increased strength if the fiber orientation is made prominent in the directions selected for the component.

In connection with FIG. 16, it is noted that the fabric handling array 34 need not move to an intermediate position between the layup table 20 and the mold 22 before its orientation is changed (as indicated by the arrow 86). The operation of the fabric handling array 34 has been described in this manner to simplify the discussion of this sequence of operation of the fabric handling apparatus 10 of the present invention.

As should be apparent from the foregoing, still further modes of operation are possible for the fabric handling apparatus 10 of the present invention. The present invention, therefore, is not intended to be limited to the specific operations that are discussed above.

In one contemplated alternative embodiment to those discussed above, it is possible that the layup table 20 and the mold 22 may be constructed to move underneath the fabric handling array 34 instead of the fabric handling array 34 moving above the layup table 20 and the mold 22. If so, the fabric handling array 34 may be pivotably mounted onto a structure suspended above the layup table 20 and mold 22.

In a further contemplated embodiment of the present invention, the layup table 20 and/or the mold 22 may be rotatable with respect to the fabric handling array 34. In this contemplated embodiment, the positioning of the fabric shapes 62 (which is intended to encompass the fabric shapes 62O, 62C, 62R in addition to any other shapes) may be facilitated by the rotation of one or both of the layup table 20 and the mold 22.

Figure 20:
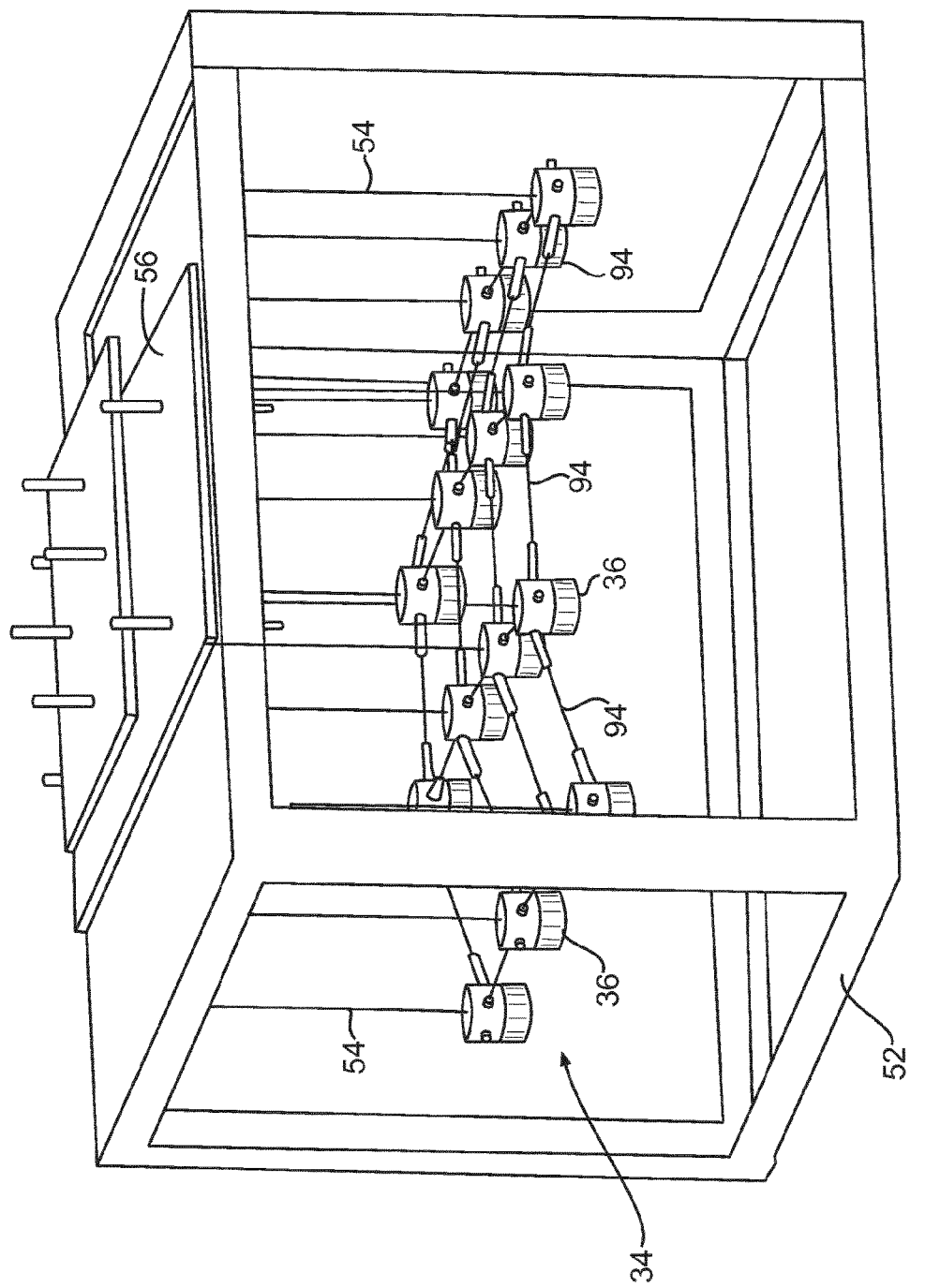
FIG. 20 is a perspective illustration of a smaller version of the fabric handling array depicted in FIG. 4, providing detail concerning connections between the attractors forming the fabric handling array.

FIG. 20 is a perspective illustration of a portion of the fabric handling array 34 discussed above in connection with FIGS. 1-19. In this illustration, the portion of the fabric handling array 34 is shown within the frame 52. The attractors 36 are disposed such that they form a convex shape, which is understood to be consistent with the shape of the mold 22. Each of the attractors 36 are suspended from a cable 54, as noted above.

As also illustrated in FIG. 20, the attractors 36 are connected to one another via connector elements 94. The connector elements 94 connect each attractor 36 to the adjacent attractor 36. The connectors 94 are provided to maintain the attractors 36 in relative position with respect to one another. In other words, the connectors 94 are provided so that the fabric handling array 34 maintains its configuration regardless of its state of operation.

Figure 21:
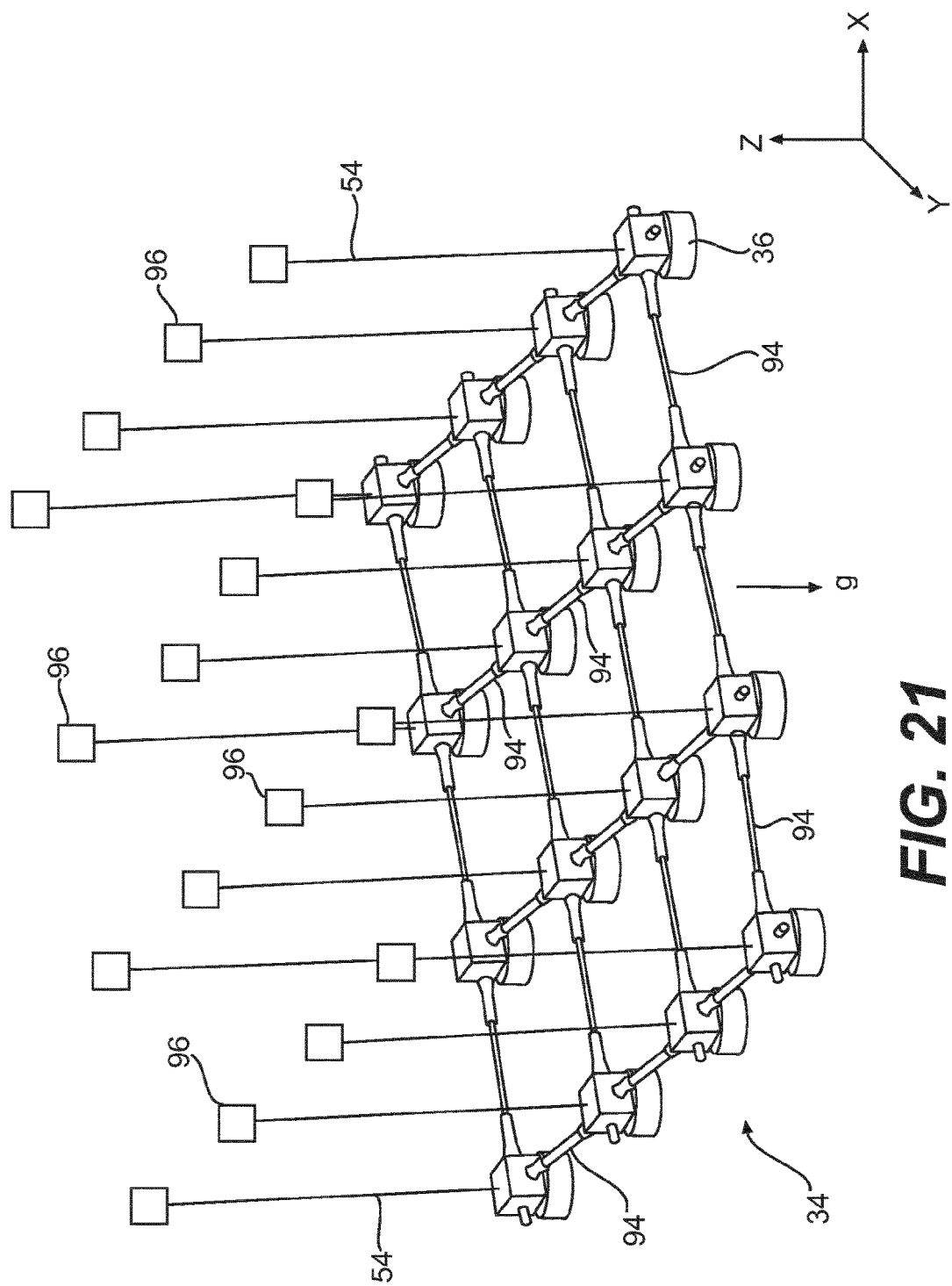
FIG. 21 is a perspective illustration of an attractor array that forms a part of the fabric handling array depicted in FIG. 20.

FIG. 21 illustrates the portion of the fabric handling array 34 that is shown in FIG. 20. Here, the attractors 36 are arranged along a plane. This is considered to be the rest (or inactive) position for the attractors 36 in the fabric handling array 34. Also shown in this illustration are the height adjusters 96. The height adjusters 96 are connected to the cables 54 from which the attractors 36 are suspended. The height adjusters 96 control the height of the attractors 36 with respect to the rest or inactive position shown in FIG. 21. Specifically, the height adjusters 96 either shorten the cable 54, thereby increasing the height of the attractor 36 to which it is connected, or lengthen the cable 54, thereby decreasing the height of the attractor 36.

As a point of reference, it is noted that the height of the attractors 36 is assessed in relation to the z-axis, which is provided in FIG. 21. The z-axis should be understood to be parallel to the force of gravity g, which is also shown in FIG. 21.

As should be apparent from FIGS. 20 and 21, the fabric handling array 34 is essentially a semi-rigid structure that permits the actuators 36 to move with respect to one another, as limited by the constraints imposed by the connectors 94. As such, the attractors 36 may be configured into any of a number of different shapes to accommodate the surface configuration of the mold 22.

Figure 22:
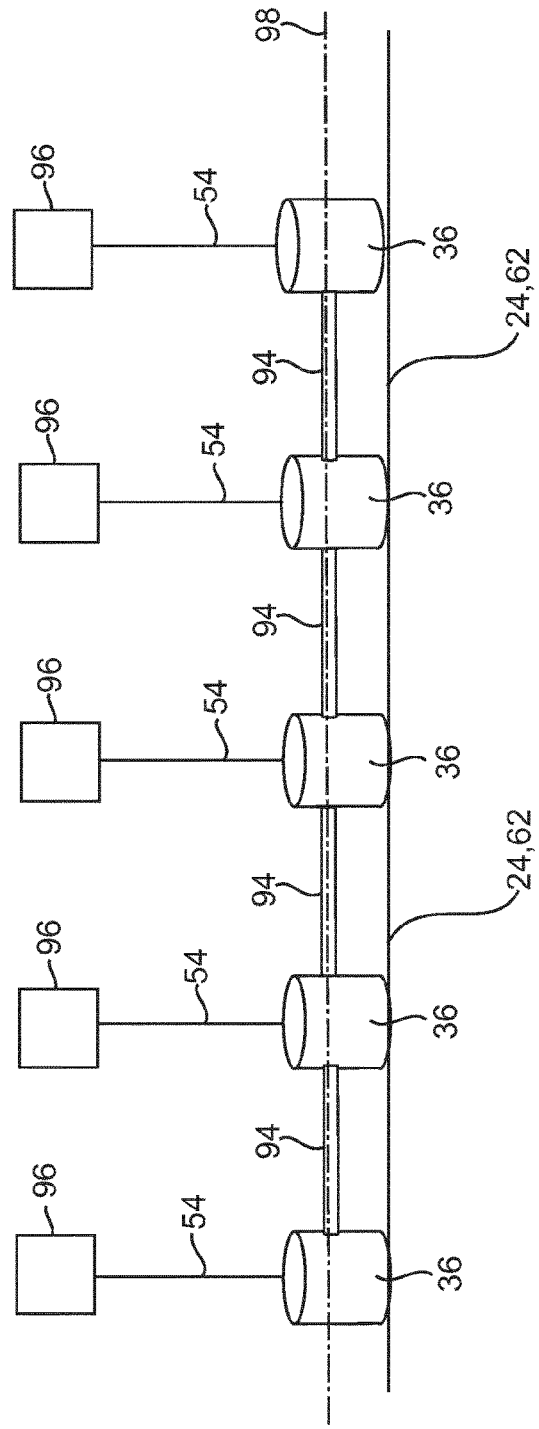
FIG. 22 is a graphical, side view of a first contemplated embodiment of five attractors forming part of the attractor array illustrated in FIG. 21, with the attractors being aligned parallel to a reference plane.

In the illustrated embodiment, the connectors 94 maintain the relative relationship of the attractors 36 with respect to one another so that the attractors 36 maintain a stable three dimensional relationship with respect to one another. Specifically, it is contemplated that the connectors 94 are rigid connectors. As such, the connectors 94 are contemplated to have little elasticity or compressibility. As such, the connectors 94 maintain the attractors 36 in relative relationship to one another along the x, y, and z axes, as shown in FIG. 22. In the instance where an electrostatic mat is employed, the structure of the mat takes the place of the connectors 94 to maintain the attractors in a stable three dimensional relationship with respect to one another.

As should be apparent from FIG. 21 (among other figures), the connectors 94 establish essentially inelastic distances between adjacent attractors 36. The connectors 94 effectively ensure that the array 34 will present a smooth, continuous shape while the array 34 carries the fabric 24 from the layup table 20 to the mold 22.

FIG. 22 is a graphical, side view of five attractors 36 that are connected to one another via the connectors 94. As discussed above, the attractors 36 are shown in the inactive or rest state, where the attractors 36 are oriented parallel to a plane 98. For illustrative purposes, a piece of fabric 24 or a fabric shape 62 is also provided in this view.

Figure 23:
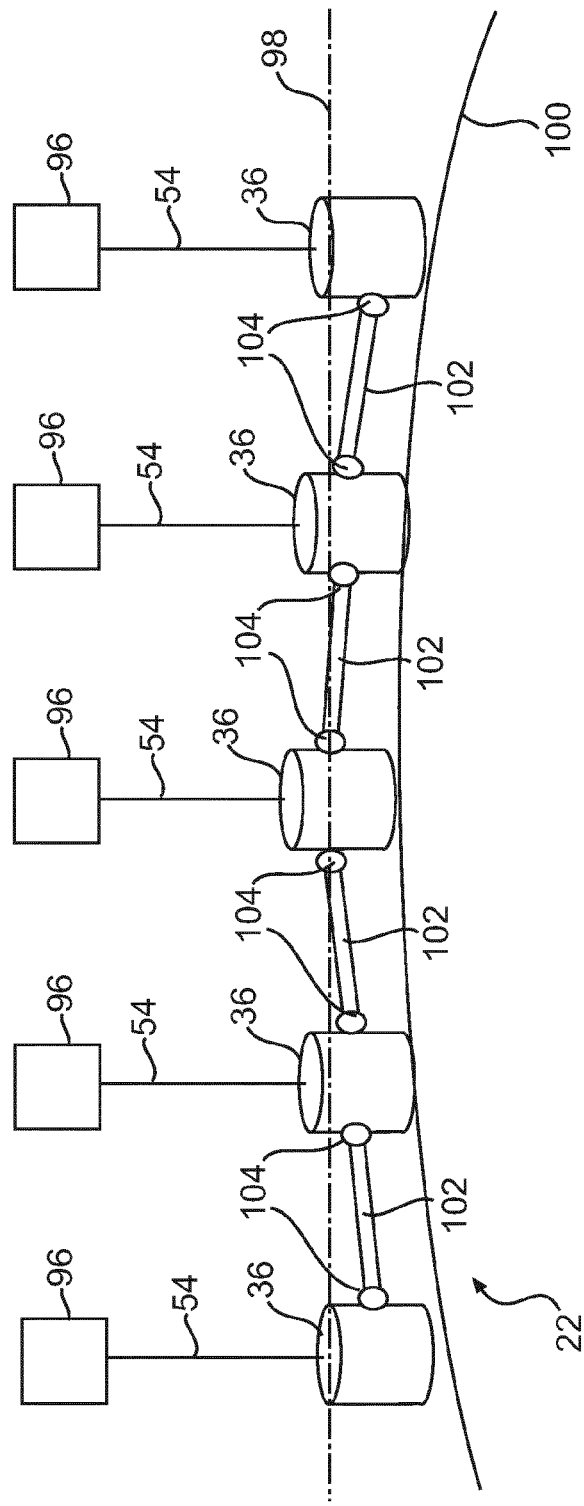
FIG. 23 is a graphical, side view of a second contemplated embodiment of attractors forming part of the attractor array shown in FIG. 21, with the attractors being aligned with respect to a convex mold surface.

FIG. 23 is a graphical, side view of the five attractors 36 that are illustrated in FIG. 22. In this embodiment, the attractors 36 have been reoriented to contour to the surface of a convex feature 100 on the mold 22.

Figure 24:
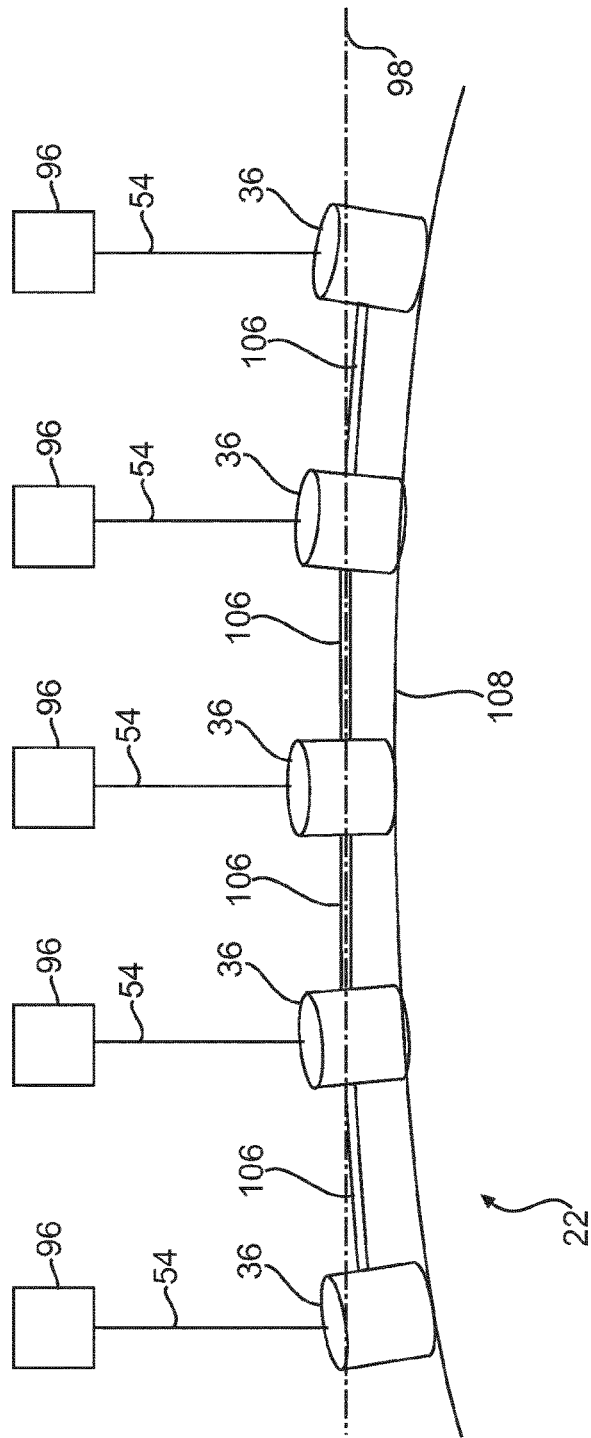
FIG. 24 is a graphical, side view of a third embodiment of five attractors forming part of the attractor array shown in FIG. 21, with the attractors being aligned with respect to a convex mold surface.

In the embodiment illustrated in FIG. 23, the connectors 102 are contemplated to be rigid or semi-rigid members with ball joints 104 at either end. With this construction, the connectors 102 permit adjacent attractors 36 to move vertically with respect to one another while maintaining adjacent attractors 36 in positional relationship (along the x- and y-axes). As noted above, the connectors 102 maintain the attractors 36 in a relatively constant position with respect to one another, despite any height difference between adjacent attractors 36. In other words, as described above, the connectors 102 help to maintain the attractors 36 in a stable three dimensional, positional relationship regardless of the exact three dimensional configuration of the array 34. In this manner, the array 34 presents a structure that discourages the formation of wrinkles or distortions in the fabric 24 while the fabric 24 is being moved from the layup table 20 to the mold 22. FIG. 24 is a graphical side view of the same five attractors 36 that are illustrated in FIG. 23. In this illustration, however, the connector 102 has been replaced by a connector 106. In this embodiment, the connector 106 connects between adjacent attractors 36 without a ball joint 104. So that the attractors 36 may move with respect to one another in this configuration, the connectors 106 are made from a flexible or semi-flexible material that permits the connectors 106 to bend along an arc. This permits the attractors 36 to conform to the shape of the convex feature 108 on the mold 22.

Figure 25:
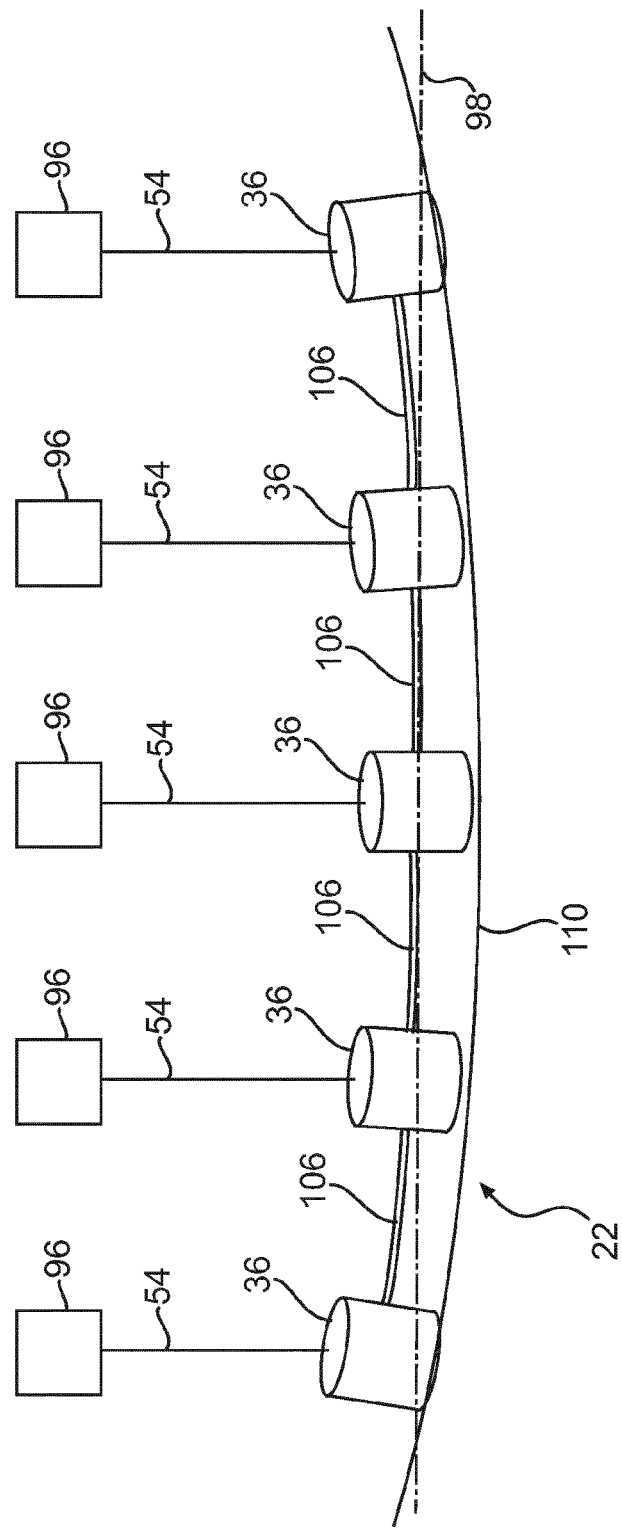
FIG. 25 is a graphical, side view of the five attractors illustrated in FIG. 24, with the attractors being aligned with respect to a concave mold surface.

FIG. 25 is a graphical, side-view representation of the five attractors 36 that are depicted in FIG. 24. In this illustration, the attractors are disposed adjacent to a concave feature 110 on the mold 22.

Figure 26:
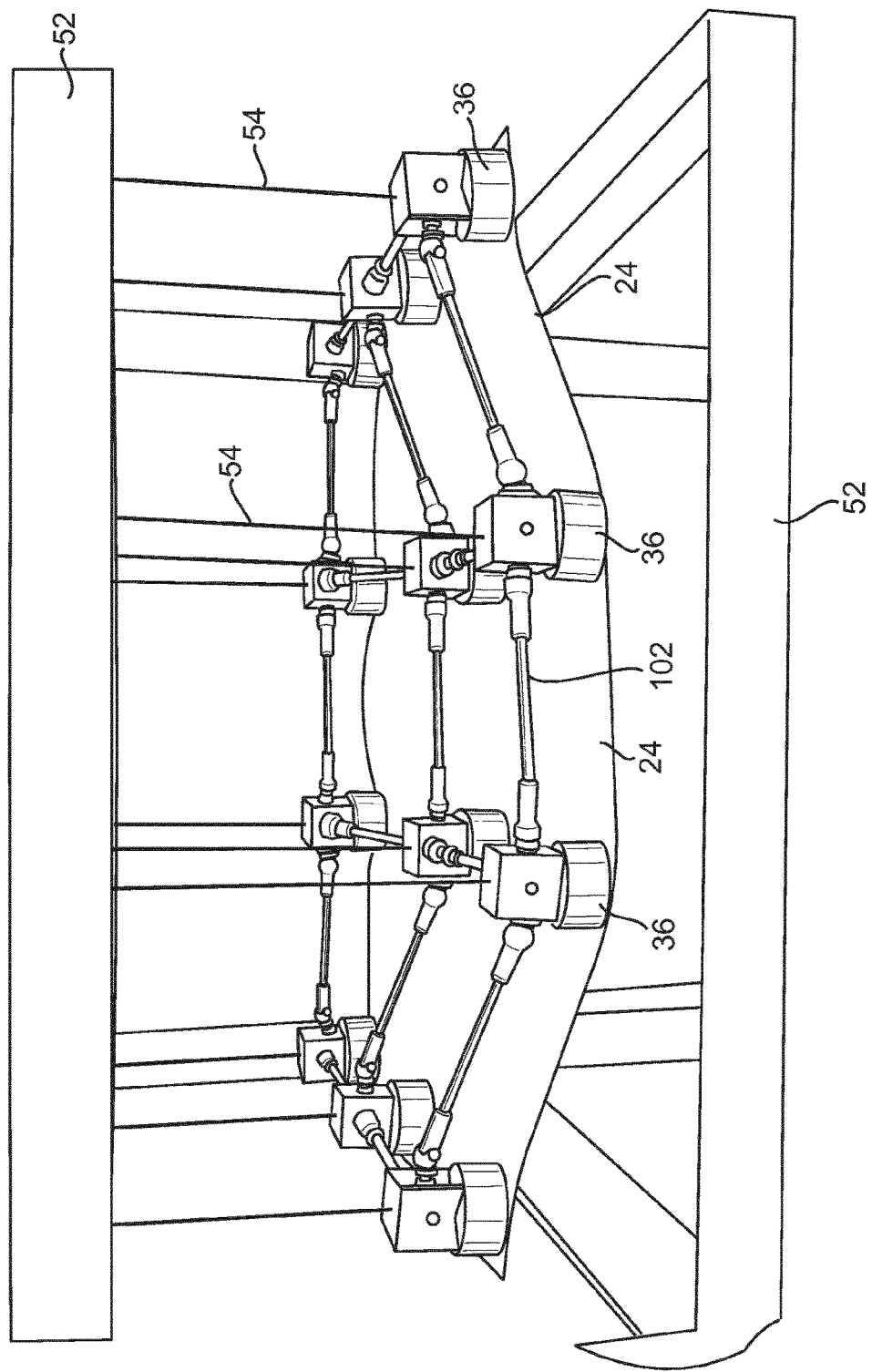
FIG. 26 is a perspective illustration of a portion of a mock-up of an attractor array consistent with the embodiment illustrated in FIG. 23, showing a portion of a piece of fabric attached thereto.

FIG. 26 is a perspective illustration of twelve of the attractors 36 and connectors 102 that are illustrated in FIG. 23. As should be apparent from this illustration, each line of attractors may be configured differently than the adjacent row, within the limits of the connector 102. As such, the fabric handling array 34 may conform to any suitable three dimensional shape of the mold, permitting deposition of the fabric 24 thereon.

As noted above, with respect to the fabric handling array 34, it is contemplated that the operation of the array will be controlled by a suitable processor such that each attractor 36 is controllable individually. As a result, only those attractors 36 that are required to engage the fabric 24 need to be activated when the fabric handling array 34 picks up fabric 24 from the layup table 20. In addition, it is contemplated that the attractors 36 may be controlled so that they each apply a different force on the fabric 24, as required or as desired.

Figure 27:
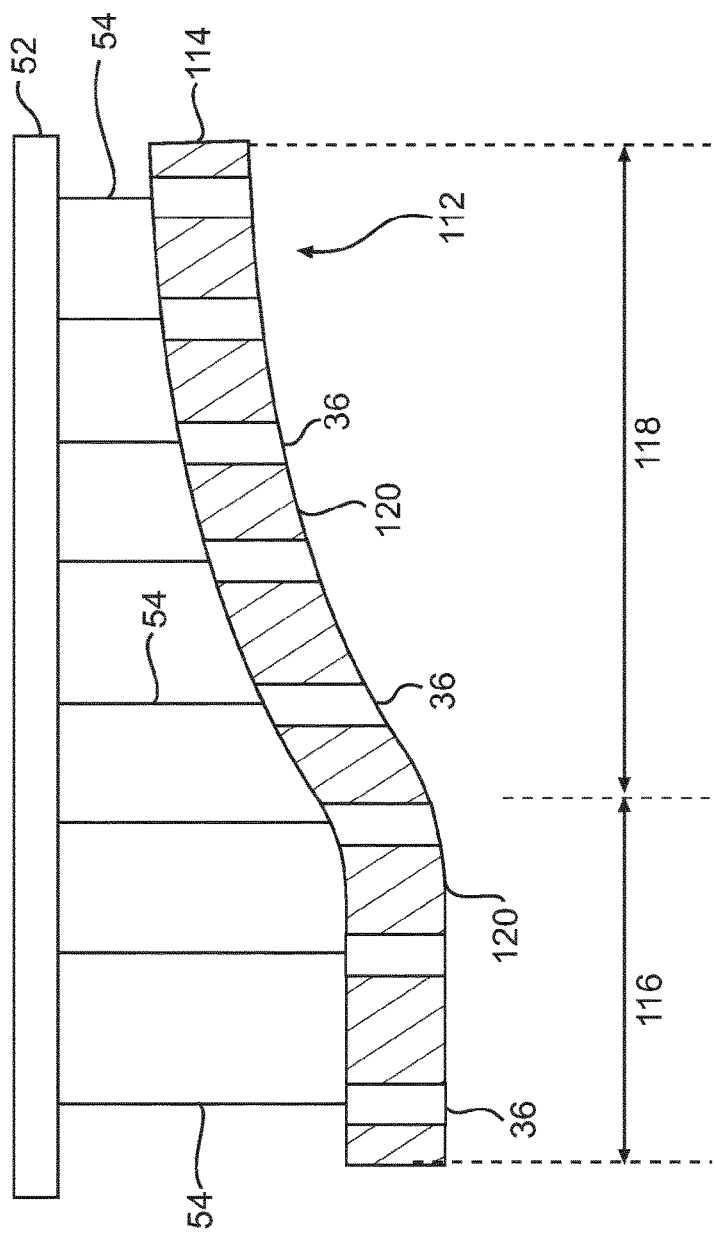
FIG. 27 is a graphical, side view of an embodiment of the present invention where individual attractors are connected to one another via a mat.

As mentioned above, one contemplated embodiment of the present invention incorporates the attractors in a mat 112, which embodiment is illustrated in FIG. 27 in graphical format. The mat 112 includes a flexible body 114 that incorporates the attractors 36 suspended from cables 54 that connect to the frame 52. In the cross-sectional side view illustrated, the mat 112 is shown in a modified configuration where one side 116 has a planar shape while the right side 118 has a curved shape. As should be apparent, the mat 112 may take any suitable shape. As also should be apparent, intermediate portions 120 of the mat 112 function as the connectors 120 between individual ones of the attractors 36.

Figure 28:
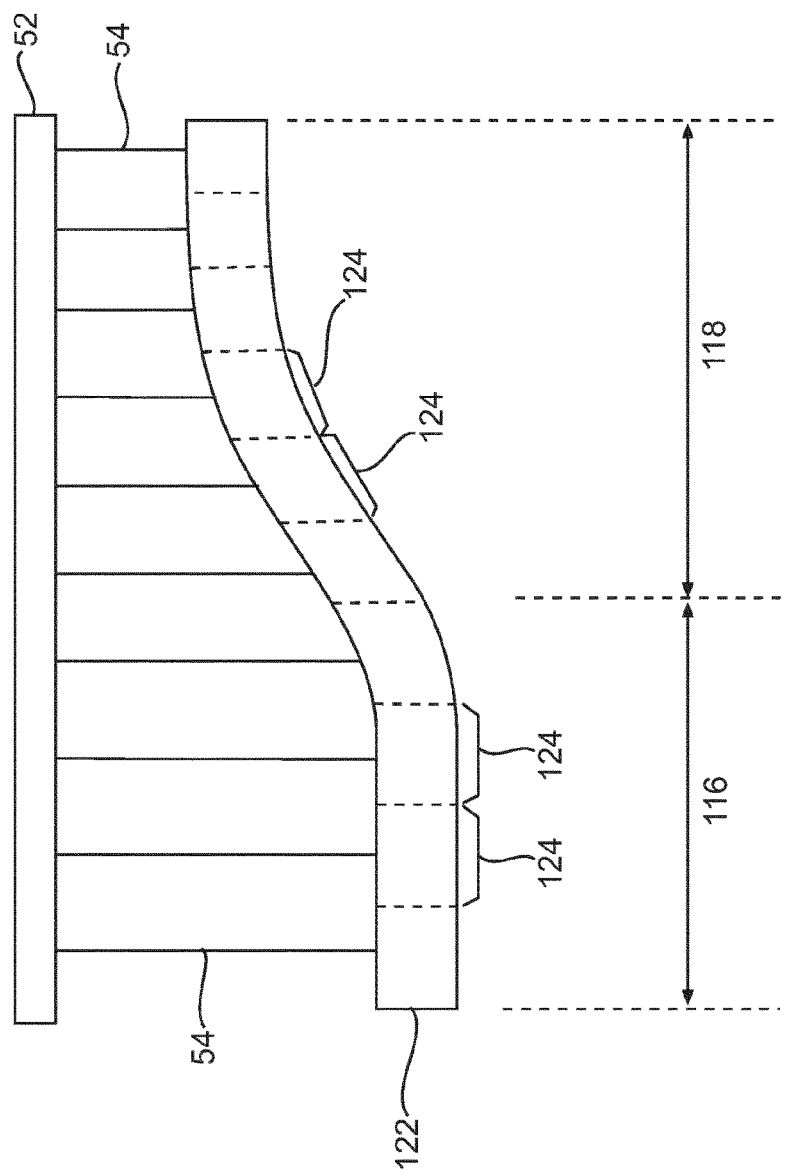
FIG. 28 is a graphical, side view of another embodiment of the present invention where the mat is divided into separate electrostatic attractors.

FIG. 28 is a graphical side view of an alternative embodiment to the embodiment shown in FIG. 27. In this embodiment, the mat 122 is divided into separate electrostatic zones 124, each of which is separately controllable to attract the fabric 24 thereto. In this embodiment, the attractors 36 are established by the electrostatic zones 124. In this embodiment, the electrostatic zones 124 are suspended from cables 54, as in prior embodiments.

Figure 29:
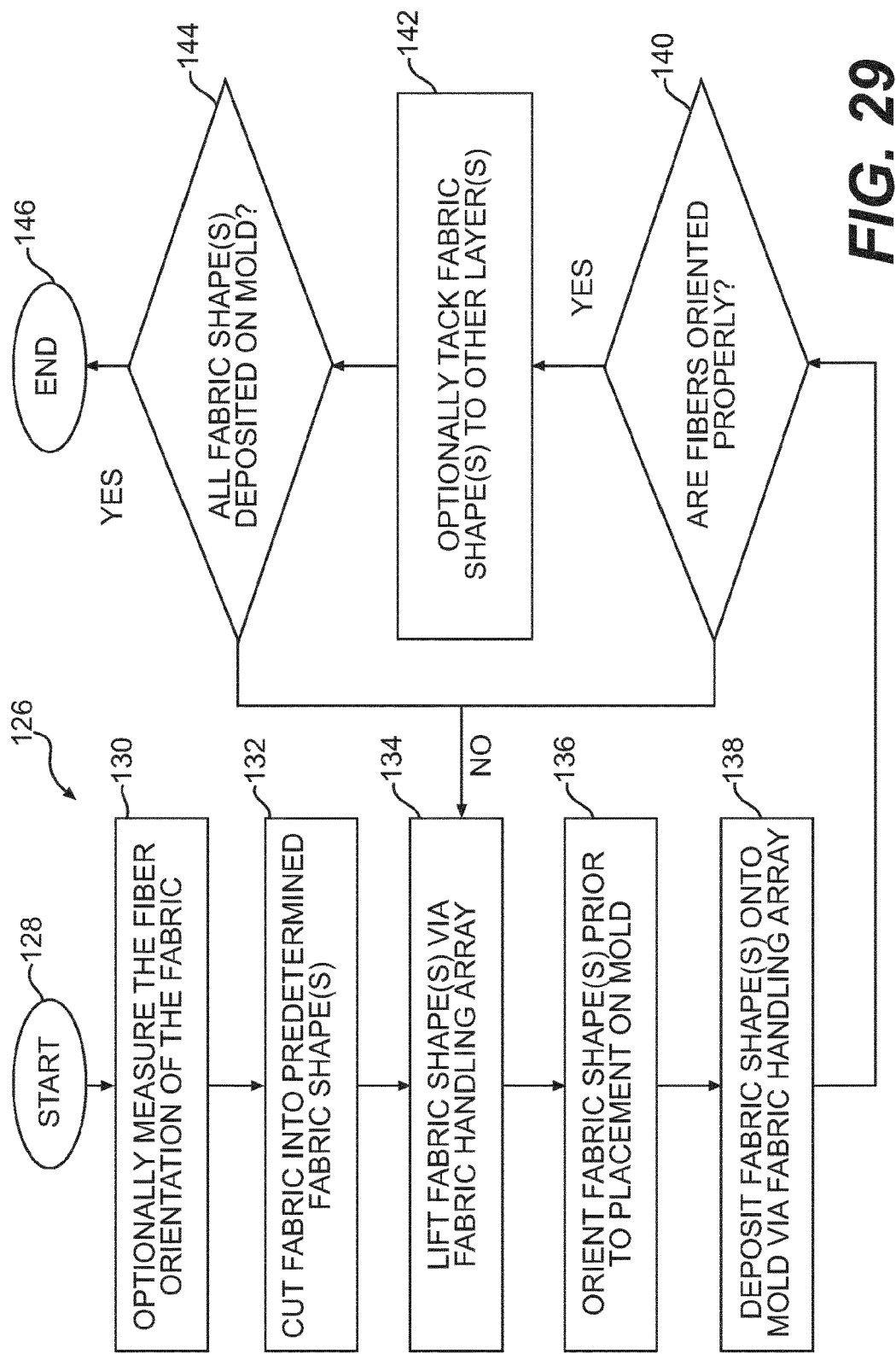
FIG. 29 is a flow chart illustrating one contemplated method according to the present invention.

Reference is now made to FIG. 29, which is a flow diagram outlining one method 126 contemplated by the present invention.

The method 126 starts at step 128. The method then proceeds to step 130 where the fabric handling apparatus 10 optionally measures the orientation 76 of the fibers in the fabric 24. This step 130 is optional because the orientation 76 of the fibers in the fabric 24 may be known prior to the placement of the fabric 24 on the layup table 20. The orientation 76 of the fibers in the fabric 24 may be important to the construction of the aircraft component, because the layers of fabric may be required to overlie one another with the fibers in different orientations 76. As noted above, when each layer of fabric 24 is layered at a different orientation 76, the resulting aircraft component may exhibit increased strength in multiple directions. As should be apparent, the aircraft component may be engineered to have increased strength in certain directions but not others.

Once the orientation 76 of the fibers in the fabric has been determined, the method 126 proceeds to step 132.

At step 132, the method 126 cuts the fabric 24 into one or more predetermined fabric shapes 62. As should be apparent, the fabric shapes 62 may have any suitable shape or size for construction of the aircraft component on the mold 22. It is noted that the size of the fabric handling array 34 is designed to be larger than any of the individual fabric shapes 62 that are cut on the layup table 20.

After the fabric shapes 62 are cut, the method 126 proceeds to step 134. At step 134, the fabric handling array 34 picks up one or more of the fabric shapes 62. As noted above, the fabric handling array 34 may be instructed to pick up only one of the fabric shapes 62 at a time. Alternatively, the fabric handling array 34 may be instructed to pick up all of the fabric shapes 62 (or several of the fabric shapes 62) that are on the layup table 20.

After the fabric shape(s) 62 are picked up by the fabric handling array 34, the method 126 proceeds to step 136.

At step 136, the fabric handling array 34 orients the fabric shape(s) for placement onto the mold 22. As noted above, the fabric handling array 34 may rotate to any suitable degree so that the fabric shapes 62 are properly oriented on the mold 22. This includes orienting the fibers in the fabric 24 with the fibers of any previously-deposited or subsequently-deposited layers of the fabric 24.

As should be immediately apparent, step 134 and step 136 may be transposed without departing from the scope of the present invention. Specifically, the orientation of the fabric handling array 34 may be altered before (step 136) before the fabric handling array 34 picks up the fabric shapes 62 (step 134).

Once either step 134 or step 136 is completed, the method 126 proceeds to step 138. At step 138, the fabric shapes 62 are deposited onto the mold 22 from the fabric handling array 34. As should be apparent from the foregoing, this step presumes that the fabric handling array 34 has traveled from the layup table 20 to the mold 22.

After the fabric shapes 62 are deposited on the mold 22, the method 126 proceeds to step 140, where the method 126 determines if the fibers are oriented properly in this optional step 140. This determination may include, but is not limited to, determining if the fibers are oriented along a predetermined axis or direction. This step 140 also may include an assessment as to the placement of the fabric shapes 62 in a predetermined location in addition to the assessment of the fiber orientation of the fibers in the fabric shapes 62.

If the fibers are not oriented in a predetermined orientation as determined in step 142 and/or if the fabric shapes 62 are not oriented in a predetermined location, the method 126 returns to step 134. If properly located and/or oriented, the method 126 proceeds to step 142, where the method 126 optionally tacks the deposited fabric shapes 62 to any layers of fabric 24 that were previously deposited onto the mold 22. Typically, tacking occurs at selected points along the edges of the fabric shapes 62 to hold the fabric shapes 62 in place while further layers are deposited on top thereof This tacking step 140 is optional, because not all fabric shapes 62 will require tacking; for example, the first fabric typically does not require tacking.

After the optional step 142, the method 126 proceeds to step 144, where the method 126 queries if all of the fabric shapes 62 have been deposited onto the mold 22. If the answer is "no," the method 126 returns to step 134. If the answer is "yes," the method 126 proceeds to step 146.

At step 146, the method 126 ends.

As noted above, the present invention is described in connection with one or more embodiments thereof. The embodiments are intended to be illustrative of the breadth of the present invention. Focus on any one particular embodiment is not intended to be limiting thereof. The present invention, therefore, is intended to encompass variations and equivalents, as would be appreciated by those skilled in the art.

What is claimed is:

1. A fabric handling apparatus, comprising:
    a layup table;
    a mold disposed adjacent to the layup table;
    two overhead rails extending above the layup table and the mold, the rails disposed a predetermined distance from one another in parallel,
    frame handlers movable across the overhead rails,
    a fabric handling array suspended from the overhead rails and suspended above the layup table and the mold, the fabric handling array being adapted to transfer at least one fabric shape from the layup table to the mold, the fabric handling array comprising a plurality of attractors in an attractor array, and
    a frame, wherein the attractors are suspended from the frame such that the attractors are displaceable vertically with respect to the frame, the frame being connectable to the frame handlers via pivots permitting the frame to rotate with respect to the layup table,
    wherein an orientation of the fabric handling array is alterable with respect to at least one of the layup table and the mold so that the at least one fabric shape is positionable on the mold in a predetermined orientation.

2. The fabric handling apparatus of claim 1, further comprising:
    at least one gantry rail, disposed transversely to the two overhead rails and supporting the two overhead rails,
    wherein the two overhead rails are adapted to move along the at least one gantry rail.

3. The fabric handling apparatus of claim 2, wherein the at least one gantry rail comprises two gantry rails disposed a predetermined distance from one another in parallel.

4. The fabric handling apparatus of claim 1, wherein:
    the mold comprises a surface adapted to receive the at least one fabric shape to form at least one aircraft component,
    wherein the surface defines a shape of the at least one aircraft component.

5. The fabric handling apparatus of claim 4, wherein the surface defines the exterior shape of at least a portion of a wing for an aircraft.

6. The fabric handling apparatus of claim 1, further comprising:
    a height adjustment device operably connected to each attractor to displace the attractor vertically with respect to the frame.

7. The fabric handling apparatus of claim 6, further comprising:
    a cable extending between height adjustment device and the attractor,
    wherein spooling of the cable permits displacement of the attractor with respect to the frame.

8. The fabric handling apparatus of claim 1, wherein the fabric handling array further comprises:
    a plurality of connectors connecting adjacent ones of the attractors to one another to maintain the attractors in a substantially constant positional relationship with respect to each other.

9. The fabric handling apparatus of claim 8, wherein the connectors each comprise:
    a rigid shaft; and
    two ball joints, one at each end of the rigid shaft,
    wherein the ball joints allow angular displacement of the rigid shaft when the attractors move vertically with respect to one another.

10. The fabric handling apparatus of claim 8, wherein the connectors each comprise:
    a flexible shaft,
    wherein the flexible shaft bends when the attractors move vertically with respect to one another.

11. The fabric handling apparatus of claim 8, wherein the connectors form a flexible mat that connects the attractors to one another.

12. The fabric handling apparatus of claim 1, wherein the attractors comprise:
    suction cups connected to at least one source of suction.

13. The fabric handling apparatus of claim 12, wherein the source of suction comprises a vacuum source.

14. The fabric handling apparatus of claim 12, wherein the source of suction comprises a pressurized gas that is supplied to the suction cups that operate via a Coanda principle.

15. The fabric handling apparatus of claim 1, wherein the attractors comprise:
   electrostatic devices connected to a source of electricity.

16. The fabric handling apparatus of claim 1, further comprising:
   at least one layup table robot disposed adjacent to the layup table, wherein the at least one layup table robot is capable of executing at least one of cutting a fabric into the fabric shape or assessing an orientation of fibers in the fabric shape.

17. The fabric handling apparatus of claim 16, further comprising:
   a layup table robot track disposed adjacent to the layup table on which the layup table robot travels.

18. The fabric handling apparatus of claim 1, further comprising:
   at least one mold robot disposed adjacent to the mold, wherein the at least one mold robot is capable of executing at least one of assessing an orientation of fibers in the fabric shape or tacking the fabric shape to at least one other fabric shape deposited on the mold.

\* \* \* \* \*